United States Patent
Li et al.

(10) Patent No.: US 10,967,363 B1
(45) Date of Patent: Apr. 6, 2021

(54) TWO-DIMENSIONAL METAL CARBIDE CATALYST

(71) Applicants: Iowa State University Research Foundation, Inc., Ames, IA (US); Purdue Research Foundation, West Lafayette, IN (US)

(72) Inventors: Zhe Li, Ames, IA (US); Yue Wu, Ames, IA (US); Jeffrey T. Miller, West Lafayette, IN (US); Fabio Henrique Ribeiro, West Lafayette, IN (US); Zhenwei Wu, West Lafayette, IN (US); Yanran Cui, West Lafayette, IN (US); Garrett Mitchell, West Lafayette, IN (US)

(73) Assignees: Iowa State University Research Foundation, Inc., Ames, IA (US); Purdue Research Foundation, West Lafayette, IN (US)

(*) Notice: Subject to any disclaimer, the term of this patent is extended or adjusted under 35 U.S.C. 154(b) by 82 days.

(21) Appl. No.: 16/162,119

(22) Filed: Oct. 16, 2018

Related U.S. Application Data

(60) Provisional application No. 62/579,364, filed on Oct. 31, 2017, provisional application No. 62/572,903, filed on Oct. 16, 2017.

(51) Int. Cl.
*B01J 27/22* (2006.01)
*B01J 27/24* (2006.01)
*B01J 23/42* (2006.01)

(52) U.S. Cl.
CPC ............... *B01J 27/22* (2013.01); *B01J 23/42* (2013.01); *B01J 27/24* (2013.01)

(58) Field of Classification Search
CPC ........................................................ B01J 27/22
USPC ....................................................... 423/648.1
See application file for complete search history.

(56) References Cited

U.S. PATENT DOCUMENTS

| | | | |
|---|---|---|---|
| 9,193,595 B2 | 11/2015 | Barsoum et al. | |
| 9,415,570 B2 | 8/2016 | Barsoum et al. | |
| 9,416,011 B2 | 8/2016 | Barsoum et al. | |
| 2010/0255983 A1* | 10/2010 | Zhang | C07C 29/132 502/178 |
| 2015/0210044 A1 | 7/2015 | Barsoum et al. | |
| 2016/0336088 A1 | 11/2016 | Barsoum et al. | |
| 2017/0088429 A1 | 3/2017 | Shin et al. | |
| 2017/0294546 A1 | 10/2017 | Ghidiu et al. | |
| 2018/0309125 A1 | 10/2018 | Beidaghi et al. | |
| 2018/0371190 A1 | 12/2018 | Chopra et al. | |

OTHER PUBLICATIONS

Synthesis of two-dimensional materials by selective extraction. Michael Naguib and Yury Gogotsi Acc. Chem. Res. vol. 48, pp. 128-135 (Year: 2015).*
Anasori et al., "2D Metal Carbides and Nitrides (Mxenes) for Energy Storage," Nat Rev. Mater., 2:1-17, Jan. 2017.
Chen et al., "Catalysts for Steam Reforming of Bio-oil: A Review," Ind. Eng. Chem. Res., 56(16):4627-4637, Apr. 2017.
Ding et al., "A Two-Dimensional Lamellar Membrane: MXene Nanosheet Stacks," Angew Chem Int Ed Engl., 56 (7):1825-1829, Feb. 2017.
Li et al. , "Reactive Metal—Support Interactions at Moderate Temperature in Two-Dimensional Niobium-Carbide Supported Platinum Catalysts," Nat. Catalysis, 1:349-355, May 2018.
Li et al., "Synthesis and Thermal Stability of Two-Dimensional Carbide MXene Ti3C2 ," Mater. Sci. Eng., B, 191:33-40, Jan. 2015.
Naguib et al., "25th Anniversary Article: MXenes: A New Family of Two-Dimensional Materials," Adv Mater., 26 (7):992-1005, Feb. 2014.
Ran et al., "Ti3C2 MXene Co-Catalyst on Metal Sulfide Photo-Absorbers for Enhanced Visible-Light Photocatalytic Hydrogen Production," Nat. Comm, pp. 1-10, Jan. 2017.

(Continued)

*Primary Examiner* — Douglas B Call
(74) *Attorney, Agent, or Firm* — Haukaas Fortius PLLC; Michael H. Haukaas

(57) ABSTRACT

Metal-support interaction offers electronic, geometrical and compositional effects to tune and maneuver catalytically active sites. Here we report the first example of a reactive metal support interaction (RMSI) between Pt and various MXenes, which are two-dimensional (2D) metal carbides, nitrides, or carbonitrides. The invention thus provides intermetallic Pt/MXene nanoparticle catalysts comprising platinum and MXene moieties. $Pt_3Ti$ and $Pt_3Nb$ intermetallic nanoparticle catalysts were prepared by RMSI of Pt nanoparticles supported on $Ti_3C_2$ and $Nb_2C$ MXenes. The intermetallic structures were verified by XAS, ARSTEM, and XPS. Experimental analysis showed that the extent of alloy formation is temperature dependent. Kinetics analysis revealed that in contrast to $Pt/Al_2O_3$, Pt supported by $Nb_2CT_x$ exhibits weaker CO adsorption and the alloy-MXene interface shows enhanced ability of $H_2O$ dissociation for a water gas shift (WGS) reaction at 300° C. The catalysts also show improved selectivity and stability for alkane dehydrogenation compared to Pt.

22 Claims, 23 Drawing Sheets

(56) References Cited

OTHER PUBLICATIONS

Wu et al., "Pd—In Intermetallic Alloy Nanoparticles: Highly Selective Ethane Dehydrogenation Catalysts," Catal Sci Technol., 18:6965-6976, Aug. 2016.

Zangeneh et al., "Propane Dehydrogenation over a Commercial Pt—Sn/Al2O3 Catalyst for Isobutane Dehydrogenation: Optimization of Reaction Conditions," Chinese J Chem Eng., 21(7):730-735, Jul. 2013.

Zhang et al., "Synthesis and Charge Storage Properties of Hierarchical Niobium Pentoxide/Carbon/Niobium Carbide (MXene) Hybrid Materials," Chem. Mater., 28(11):3937-3943, May 2016.

* cited by examiner e

TWO-DIMENSIONAL METAL CARBIDE CATALYST

RELATED APPLICATIONS

This application claims priority under 35 U.S.C. § 119(e) to U.S. Provisional Patent Application Nos. 62/572,903 filed Oct. 16, 2017 and 62/579,364 filed Oct. 31, 2017, which applications are incorporated herein by reference.

GOVERNMENT SUPPORT

This invention was made with government support under Contract No. N000141612689 awarded by the Office of Naval Research. The government has certain rights in the invention.

BACKGROUND OF THE INVENTION

Engineering the active sites of supported noble metal catalysts often includes modulating the structure and composition of the sites to achieve optimal reaction rate and stability. Initially designated by Tauster et al. in 1978, strong metal support interaction (SMSI) referred to drastically suppressed chemisorption due to oxide migration on metal nanoparticles after high-temperature $H_2$ reduction (*Acc. Chem. Res.* 20, 389-394 (1987)). Recent development of new types of SMSI has been demonstrated to be an effective route to tune active sites of catalysts via electronic effects and adsorbate functionalized overlayer. Unlike SMSI, a so-called reactive metal support interaction (RMSI) involves formation of bimetallic alloys owing to reaction between the admetals and oxide supports, which promotes catalytic reactions from steam reforming to hydrogenation.

MXenes, emerging two dimensional (2D) layered metal carbides/carbonitrides materials, are usually produced by selective extraction of the "A" layers from the layered ternary transition metal carbides called MAX phases (Lukatskaya et al., *Science* 341, 1502-1505 (2013)). This synthesis procedure results in the termination of MXenes surface by functional groups such as OH, O and F. Thus, MXenes have a general formula $M_{n+1}X_nT_x$, where M represents an early transition metal, X is C or N, n varies from 1 to 3, and T represents the surface functional groups (Naguib et al., *Adv. Mater.* 26, 992-1005 (2014)).

MXenes have been intensively developed as electrodes in batteries and supercapacitors by virtue of their good electrical conductivities. MXenes recently garnered interest in photo/electrochemical reactions. For instance, $MoS_2/Ti_3C_2$ composites were reported as promising materials for hydrogen evolution reactions due to their outstanding metallic conductivity as well as the unique functional groups on the surfaces. However, the catalytic properties of MXenes, to the best of our knowledge, are yet to be well understood. On account of thermal stability and the rich surface chemistries originated from termination groups of the 2D carbides, MXenes may be developed as supports for noble metal catalysts and thus exploring their thermal catalytic applications is worthwhile. Accordingly, there is a need for new MXene catalysts and methods for their use in catalysis.

Light alkane dehydrogenation currently draws increasing research interest owing to abundant feedstock supply from the shale gas boom. For this reaction, catalysts with weak light olefin binding strength are desired, which suppress further conversion of the olefin to side products and coke. Previously, this was realized by promoting platinum (Pt) catalysts with tin (Sn) to form Pt—Sn alloys. However, the excess Sn promoter could be reduced but not alloyed and cover the active sites. Recent DFT studies suggest that intermetallics formed between Pt and early transitional metals (TMs) such as titanium also exhibit weak binding capability to hydrocarbons. These early TMs are strongly oxyphilic and difficult to reduce, which on one hand prevents reduction of excess promoters on the catalyst, but on the other hand also challenges preparation of nanoparticles (NPs) consisting of early TMs. Previous work attempted using very strong reducing agents such as sodium naphthalene or reduction at high temperature above 800° C. for synthesizing $Pt_3Ti$ intermetallic NPs, which led to the formation of disordered alloys or significant particle sintering.

Metal support interactions have recently shown great potential in experimental control of catalyst structures, especially with the introduction of new materials as supports. RMSI suggests that metal nanoparticles could react with support materials at elevated temperatures to form intermetallics, and the reaction temperature and resulting nanoparticle size depend on the reactivity of the support. MXenes are characterized by high thermal stability and rich surface chemistries, which characteristics potentially enable highly reactive interaction with metal nanoparticles.

Accordingly, there is a need for new and improved heterogeneous catalysts, including heterogeneous catalysts for alkane dehydrogenation. There is also a need for heterogeneous catalysts for alkane dehydrogenation that have high thermal stability and that form reduced amounts of side products and coke during alkane dehydrogenation compared to known catalysts.

SUMMARY

The invention provides a catalyst that includes a reactive metal-support interaction between platinum and a two-dimensional MXene such as niobium carbide. Platinum loaded on MXenes such as $Nb_2C$ achieved a turnover rate of 0.46 $s^{-1}$ for the water gas shift reaction without side reaction (methanation). The invention thus provides a new platinum-based catalyst for water gas shift for production of hydrogen. Thin film metal carbides of Ti and Nb were prepared and addition of platinum to these resulted in bimetallic PtTi and PtNb alloys, which are catalytically active for water gas shift reactions. The catalysts have high rates and stability, and they operate at very high temperature without loss of activity. Current catalysts are typically over-reduced and permanently lose activity at similar high temperatures. Compared to other catalysts, the platinum MXene catalysts described herein have higher rates, longer life, and form less carbon, which is a significant problem for reactions at high temperature. The catalysts can be drop-in replacements with superior performance to current catalysts.

The invention also provides platinum-transition metal intermetallic alloy nanoparticle catalysts for alkane dehydrogenation, such as Pt—Ti and Pt—Nb intermetallic alloys. For example, this disclosure provides $Pt_3Ti$ and $Pt_3Nb$ intermetallic nanoparticle catalysts prepared by RMSI of platinum nanoparticles supported on $Ti_3C_2T_x$ and $Nb_2CT_x$ MXenes. The intermetallic structures were verified by X-ray adsorption spectroscopy (XAS) and atomic resolution scanning transmission electron microscopy (ARSTEM). The catalysts show improved selectivity and stability to propane and isobutane dehydrogenation compared to platinum, consistent with their weaker chemisorption strength to the intermediates and products of the reaction as predicted from Density Functional Theory.

Accordingly, the invention provides an intermetallic Pt/MXene nanoparticle catalyst comprising platinum and a MXene comprising Formula I:

$$M_{n+1}X_n \qquad (I)$$

wherein
n is 1, 2, or 3;
M is an early transition metal; and
X is carbon, nitrogen or CN;
wherein the particle comprises an alloy of platinum and the transition metal of the MXene.

In one specific embodiment, n is 1. In another specific embodiment, n is 2. In yet another specific embodiment, n is 3. The early transition metal can be titanium, vanadium, zirconium, niobium, hafnium, tantalum, molybdenum, or tungsten. In one specific embodiment, X is carbon. In another specific embodiment, X is nitrogen. In yet another specific embodiment, X is CN. Each combination of transition metal and X group is envisioned.

In one specific embodiment, the MXene of Formula I comprises $Ti_3C_2$. In another specific embodiment, the MXene of Formula I comprises $Nb_2C$.

In various embodiments, the MXene comprises a two-dimensional layered metal carbide, nitride, or carbonitride. In certain embodiments, the MXene comprises various minor amounts of metal oxides.

The platinum loading of the catalyst can be about 0.5 wt. % to about 20 wt. %. In various embodiments, the platinum loading of the catalyst can be about 1% to about 20%, about 1% to about 10%, about 1% to about 5%, or less than about 5%. In one specific embodiment, the platinum loading of the catalyst is about 1-2%.

The percentage of exposed platinum of the catalyst can be about 1-8% or about 3-5% of the platinum loading, by weight. The platinum dispersion can be greater than about 1%, greater than about 10%, or preferably greater than about 50%.

The catalyst can have an average particle size of about 0.5 nm to about 20 nm. In various embodiments, the average particle size is about 1 nm to about 10 nm, about 1 nm to about 5 nm, or about 2 nm to about 3 nm. In various embodiments, the average particle size of the catalyst can be about 1-3 nm, about 2 nm to about 3.2 nm, or about 2.6 nm.

The catalyst can include a suitable inert support such as a silica support.

In some embodiments, the catalyst is substantially free of free metallic titanium or titanium oxides. Substantially free of free metallic titanium can be less than about 0.05 wt. %, less than about 0.02 wt. %, or less than about 0.01 wt. % free metallic titanium. Substantially free of titanium oxides can be less than about 0.05 wt. %, less than about 0.02 wt. %, or less than about 0.01 wt. % titanium oxides. In various embodiments, the catalyst maintains a carbide, nitride, or carbonitride nanosheet structure after reduction by hydrogen gas at 550° C.

The invention also provides a method to provide hydrogen gas as a product of a water gas shift reaction, the method comprising contacting water, carbon monoxide, and an intermetallic Pt/MXene nanoparticle catalyst comprising platinum and a MXene comprising Formula I:

$$M_{n+1}X_n \qquad (I)$$

wherein: n is 1, 2, or 3;
M is an early transition metal; and
X is carbon or nitrogen;
wherein the particle comprises an alloy of platinum and the transition metal of the MXene; at a temperature of at least about 200° C., thereby carrying out the water gas shift reaction to provide hydrogen gas. In various embodiments, the temperature can be at least about 250° C., at least about 280° C., at least about 300° C., and often about 250° C. to about 350° C.

In one embodiment, n is 1 or 2. In some embodiments, the early transition metal is titanium, vanadium, zirconium, niobium, hafnium, tantalum, molybdenum, or tungsten.

In one specific embodiment, the MXene of Formula I comprises $Ti_3C_2$. In another specific embodiment, the MXene of Formula I comprises $Nb_2C$.

In various embodiments, the pressure of the reaction is less than 100 atmospheres and greater than 1 atmosphere. Thus, the pressure of the reaction can be less than about 100 atmospheres, less than about 50 atmospheres, and preferably less than about 20 atmospheres.

In some embodiments, the carbon monoxide conversion is greater than 1%, preferably greater than 5%, and more preferably greater than 10%.

In certain embodiments, the water gas shift rate per mole of Pt at 300° C./$10^{-2}$ mol $H_2$ (mol metal)$^{-1}$ s$^{-1}$ is at least about 1.6. Furthermore, the turnover rate at 300° C./$10^{-2}$ mol $H_2$ (mol surface metal)$^{-1}$ s$^{-1}$ can be at least about 40.

The invention yet further provides a method to provide hydrogen gas as a product of a water gas shift reaction comprising contacting water, carbon monoxide, and an intermetallic alloy of platinum and an early transition metal at a temperature of at least 200° C. for a period of time sufficient to carry out the water gas shift reaction to provide hydrogen gas. The temperature of the reaction can be run at higher temperatures, as described above. In some embodiments, the early transition metal is titanium, vanadium, zirconium, niobium, hafnium, tantalum, molybdenum, or tungsten. In certain embodiments, the intermetallic alloy comprises platinum and titanium or platinum and niobium.

The invention also provides a method for dehydrogenating an alkane comprising contacting an alkane and an intermetallic Pt/MXene nanoparticle catalyst comprising platinum and a MXene of Formula I:

$$M_{n+1}X_n \qquad (I)$$

wherein: n is 1, 2, or 3;
M is an early transition metal; and
X is carbon or nitrogen; and
wherein platinum forms an alloy with the early transition metal of the MXene;
at a temperature of at least about 350° C., thereby dehydrogenating the alkane to provide an alkene.

One specific value for n is 1. Another specific value for n is or 2. Another specific value for n is or 3.

In various embodiments, the early transition metal is titanium, vanadium, zirconium, niobium, hafnium, tantalum, molybdenum, or tungsten. In one embodiment, X is carbon. In another embodiment, X is nitrogen. In yet another embodiment, X is CN.

In one embodiment, the MXene of Formula I is $Ti_3C_2$. In another embodiment, the MXene of Formula I is $Nb_2C$.

In one embodiment, the alkane is propane and the selectivity for producing propylene from propane is at least 85%, for example, at about 20% conversion, or at greater than about 18% conversion. In another embodiment, the alkane is propane and the selectivity for producing propylene from propane is at least 20% higher than platinum on silica under similar conditions. The invention provides similar embodiments and results with respect to isobutane.

In various embodiments, the catalyst deactivates slower than platinum on silica under similar conditions. In additional embodiments, the dehydrogenation is carried out in a fixed bed reactor or in a continuous flow reactor.

The alkane used in the dehydrogenation reaction can be a linear, branched, or cyclic alkane, for example, a ($C_2$-$C_8$) alkane. In certain specific embodiments, the alkane is ethane, propane, butane, isobutane, pentane, isopentane, hexane, heptane, octane, and/or branched or cyclic isomers thereof.

The invention further provides a method for dehydrogenating an alkane comprising contacting an alkane and an intermetallic alloy of platinum and an early transition metal or metal carbide at a temperature of at least 350° C. for a period of time sufficient to dehydrogenate the alkane, thereby providing an alkene. The early transition metal can be, for example, titanium, vanadium, zirconium, niobium, hafnium, tantalum, molybdenum, or tungsten. In certain specific embodiments, the intermetallic alloy can comprise, for example, platinum and titanium or platinum and niobium.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
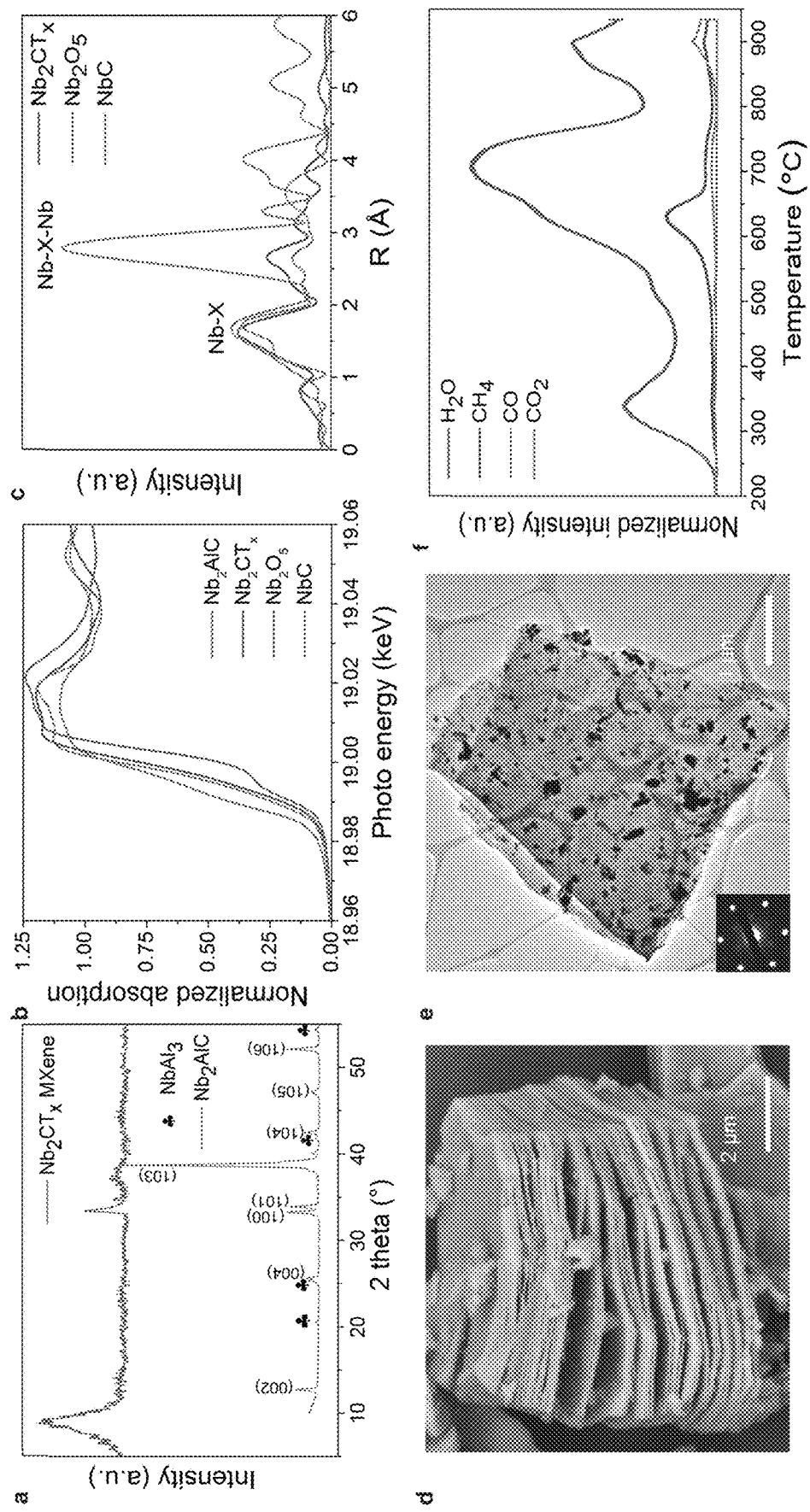
FIG. 1. Characterization of $Nb_2CT_x$ MXene support. a, XRD patterns of $Nb_2AlC$ MAX phase and $Nb_2CT_x$ MXene. b, Nb K edge XANES of $Nb_2AlC$, $Nb_2C$, NbC and $Nb_2O_5$. c, Fourier Transform of the $k^2$ EXAFS of $Nb_2CT_x$ compared to the references (NbC and $Nb_2O_5$). d, SEM image of $Nb_2CT_x$ MXene. e, TEM image of $Nb_2CT_x$ nanosheets. Inset represents the SAED showing the reserved hexagonal basal plane symmetry. f, Temperature programmed reduction (TPR) profile of $Nb_2CT_x$ MXene.

Here we report a platinum (Pt) nanoparticle catalyst supported on MXenes, such as the $Nb_2CT_x$ MXene, exhibiting an RMSI after reduction in $H_2$. RMSI refers to a chemical reaction between a metal and the support that induces the formation of bimetallic structures, which is differentiated from the more general SMSI because it is driven by the high thermodynamic stability of the resulting intermetallic compounds. Our results show that a surface Pt—Nb alloy is formed as a result of moderate-temperature (350° C.) $H_2$ reduction.

The water gas shift (WGS) reaction was selected as a model reaction to understand the effect of RMSI on adsorbates. WGS kinetics at 300° C. indicate that CO has lower relative surface coverage over $Pt/Nb_2CT_x$ and the alloy nanoparticles form an active interface for $H_2O$ activation with the reduced $Nb_2CT_x$ MXene surface, which exhibits enhanced $H_2O$ dissociation capability compared to $Pt/Al_2O_3$. Further increasing reduction temperature to 550° C. results in the formation of $Pt_3Nb$ intermetallic alloy. This work demonstrates that the bimetallic alloy formation between Pt and early transition metals such as the niobium MXene support hinges on temperature, and RMSI can be achieved on supports other than oxides.

The invention thus provides platinum-early transition metal intermetallic nanoparticle catalysts comprising a MXene support and platinum metal alloy. The invention also provides Pt—Ti and Pt—Nb intermetallic nanoparticle catalysts formed through reactive interaction with a MXene support useful as alkane dehydrogenation catalysts, as described herein.

Platinum may directly form a complete alloy with early transition metals of MXenes (2D transition metal carbides) with reduction of $H_2$. Due to the formed alloy, the $Pt/Tb_2C$ and $Pt/Nb_2C$ catalysts showed significantly higher propylene selectivity (98%) in the propane dehydrogenation reaction compared to pure Pt catalysts (85%) at similar conversion. Isobutane dehydrogenation proceeded similarly.

Accordingly, new platinum catalysts for alkane dehydrogenation are provided by this disclosure. Thin film metal carbides of Ti and Nb have been prepared, and addition of platinum to these result in bimetallic PtTi and PtNb alloys, which are selective for alkane dehydrogenation. These catalysts can operate at very high temperature without loss of activity. Current catalysts over-reduce and then permanently lose activity under similar conditions. The catalysts described herein also have higher conversion rates, longer life, and form less carbon (e.g., than $Pt/SiO_2$), which is a common problem for reactions at high temperatures. The catalysts can be drop-in replacements of current catalysts, resulting in superior performance.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* $14^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The term "about" can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, composition, or embodiment. The term about can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

An "effective amount" refers to an amount effective to bring about a recited effect, such as an amount necessary to form products in a reaction mixture. Determination of an effective amount is typically within the capacity of persons skilled in the art, especially in light of the detailed disclosure provided herein. The term "effective amount" is intended to include an amount of a compound or reagent described herein, or an amount of a combination of compounds or reagents described herein, e.g., that is effective to form products in a reaction mixture. For example, an effective amount of a platinum-transition metal alloy is formed at the surface of a MXene in the catalysts described herein in a sufficient amount to catalyze a WGS reaction or dehydrogenation reaction. Thus, an "effective amount" generally means an amount that provides the desired effect.

Reactive metal support interaction (RMSI) refers to a chemical reaction between a metal and its support that induces the formation of a bimetallic structure. The intermetallic compounds (alloys) described herein are formed due to the RMSI effect.

Support and Catalyst Preparation.

Figure 6:
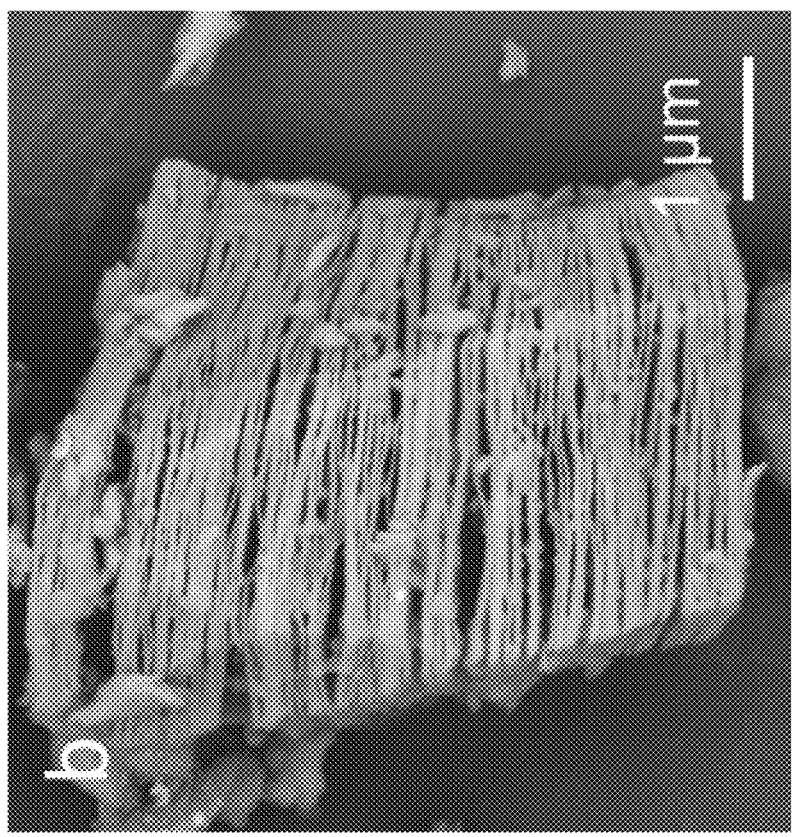
FIG. 6. SEM image of $Nb_2AlC$ MAX. The as-synthesized $Nb_2AlC$ shows the typical lamellar structure. (b) SEM image of 1% Pt/$Nb_2CT_x$ after WGS reaction showing the Pt/$Nb_2CT_x$ maintains the typical layered structure of MXene.
Figure 6:
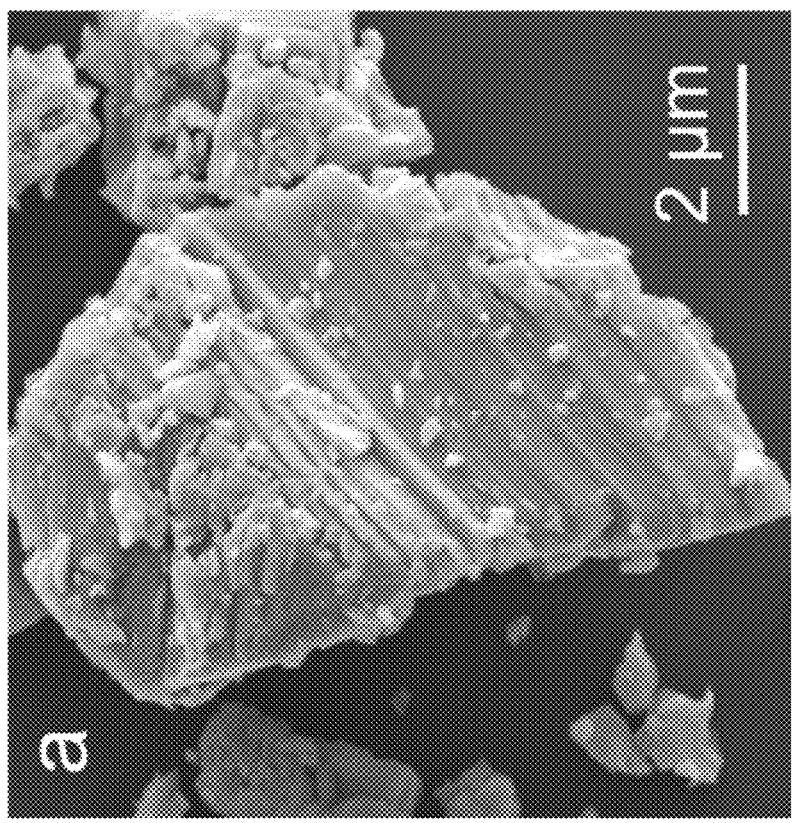

The preparation of few-layer niobium MXene ($Nb_2CT_x$) via HF treatment and $Pt/Nb_2CT_x$ catalysts via incipient-wetness impregnation method (IWI) are summarized in the Examples below. For the prepared $Nb_2CT_x$ support, X-ray diffraction (XRD) patterns (FIG. 1a) show that the (002) peak of the HF treated $Nb_2AlC$ powder downshifts to 2θ of 9.3°, corresponding to a c lattice parameter (c-LP) of 19 Å, rather than 13.9 Å for the initial MAX ($Nb_2AlC$) phase. X-ray absorption spectroscopy (XAS) was performed to further confirm structure of the niobium carbide MXene. The Nb K-edge X-ray absorption near edge structure (XANES) results presented in FIG. 1b show the $Nb_2CT_x$ has a spectrum whose shape is akin to that of commercial NbC (Sigma-Aldrich) but different from $Nb_2AlC$ and $Nb_2O_5$ (Sigma-Aldrich). The edge energy of the MXene (19000.7 eV) is close to NbC (19000.2 eV) as opposed to $Nb_2AlC$ (18998.7 eV) and $Nb_2O_5$ (19003.3 eV), evincing the removal of Al from the parent MAX phase. The edge energy of $Nb_2C$ is slightly higher than NbC, indicating it is partially oxidized due to terminal groups or $Nb_2O_5$ on the surface. X-ray absorption fine structure (EXAFS) spectra (FIG. 1c) also confirm the 2D structure of the material, since $Nb_2CT_x$ shows first shell (Nb—C) scattering resembling NbC but second shell (Nb—C—Nb) scattering much lower than that of NbC due to the reduced dimensionality. Moreover, the typical lamellar structure of $Nb_2AlC$ (FIG. 6a) is converted to an accordion-like structure (FIG. 1d), which confirms the exfoliation of individual grain along the basal planes. After mildly sonicating the $Nb_2CT_x$ MXene multilayers in deaerated ethanol, electron transparent nanosheets that were a few layers thick could be obtained, as is shown in the TEM image (FIG. 1e). Note that the surface terminated functional groups of the resulting MXenes such as O, OH, and F groups may affect reactants adsorption for WGS reaction and thus catalyst pretreatment is needed.

Figure 7:
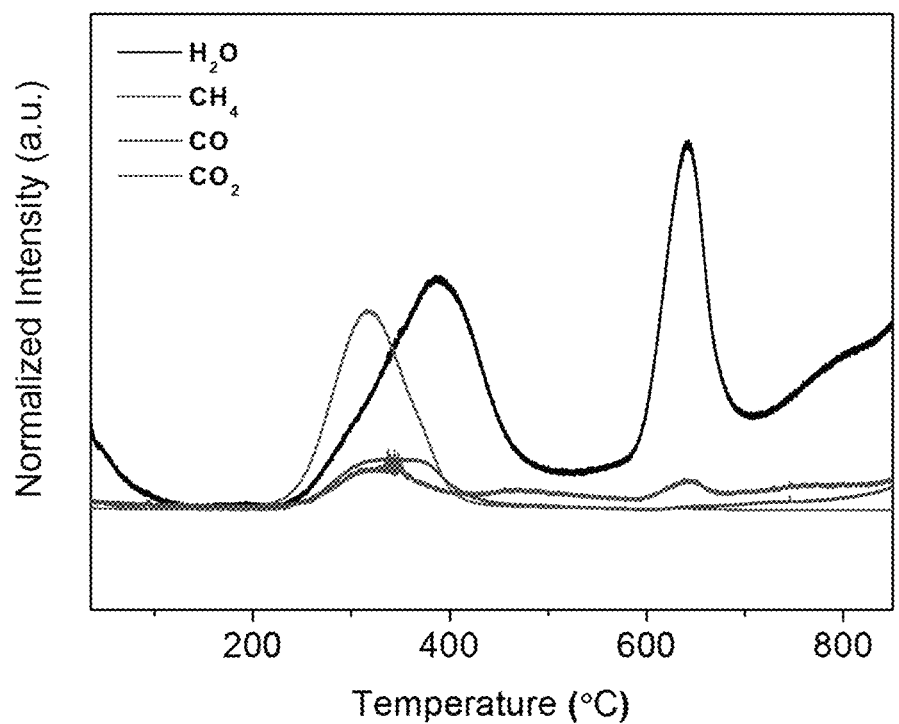
FIG. 7. TPR profile of commercial NbC. The $H_2O$ peaks at around 400° C. and 650° C. are likely due to the removal of the surface residue oxygen (Oyama et al., *Ind. Eng. Chem. Res.* 27, 1639-1648 (1988)). The residue oxygen on the surface can also desorb as CO and $CO_2$ (Ribeiro et al., *Chem. Mater.* 3, 805-812 (1991)).
Figure 8:
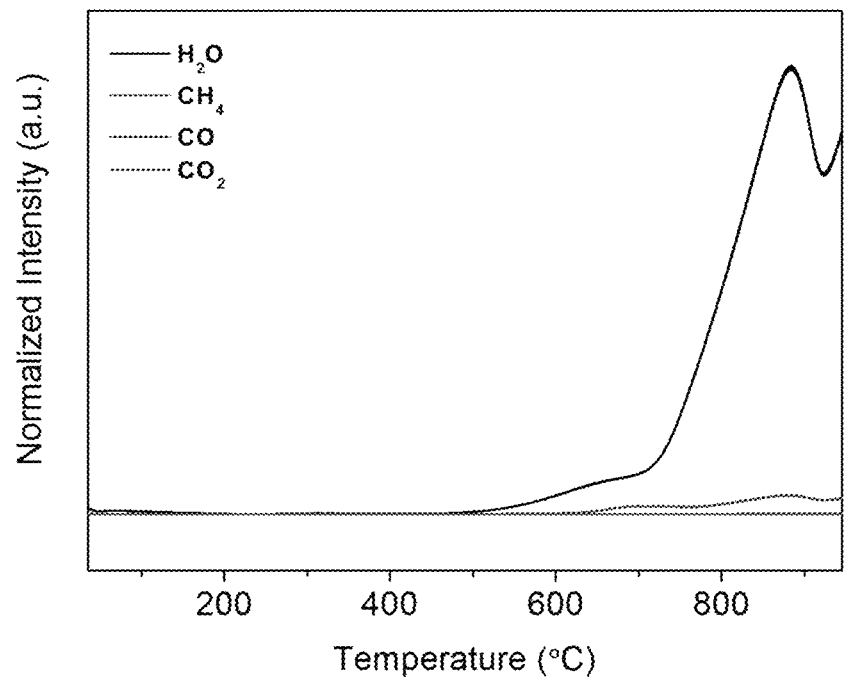
FIG. 8. TPR profile of commercial $Nb_2O_5$. The peak between 800° C. and 900° C. is due to the reduction of $Nb_2O_5$ to $NbO_2$ (Da Silva et al., *J. Solid State Chem.* 123, 168-182 (1996)); the reduction is not complete as shown by the increasing signal above 950° C.

$H_2$-temperature-programmed reduction (TPR) was employed to study the reduction of $Nb_2CT_x$ MXene (FIG. 1f). TPR results of commercial NbC and $Nb_2O_5$ (FIG. 7, 8) were also acquired as reference. $Nb_2CT_x$ MXene shows a $H_2O$ peaks at 340° C. whose position is close to the one of NbC (FIG. 7). Surface of carbides are often covered by surface oxygen or oxycarbide and simply annealing $Ti_2CT_x$ MXene in a mixture of $H_2/N_2$ at 500 K could decrease the surface O and F concentrations. Therefore, we attribute the $H_2O$ peak at 340° C. to the reduction of surface functional groups of $Nb_2CT_x$ MXene. The additional $H_2O$ peaks located above 600° C. can be assigned to the reduction of residual $Nb_2O_5$ after HF etching. The only major $CH_4$ peak around 630° C. is ascribed to the reduction of $Nb_2C$. Based on our $H_2$-TPR results, the pretreatment temperature of fresh $Pt/Nb_2CT_x$ catalysts was selected as 350° C. to reduce the surface functional groups terminated on the $Nb_2CT_x$ while still preserving the carbide structure.

Kinetics of WGS Reaction.

Figure 2:
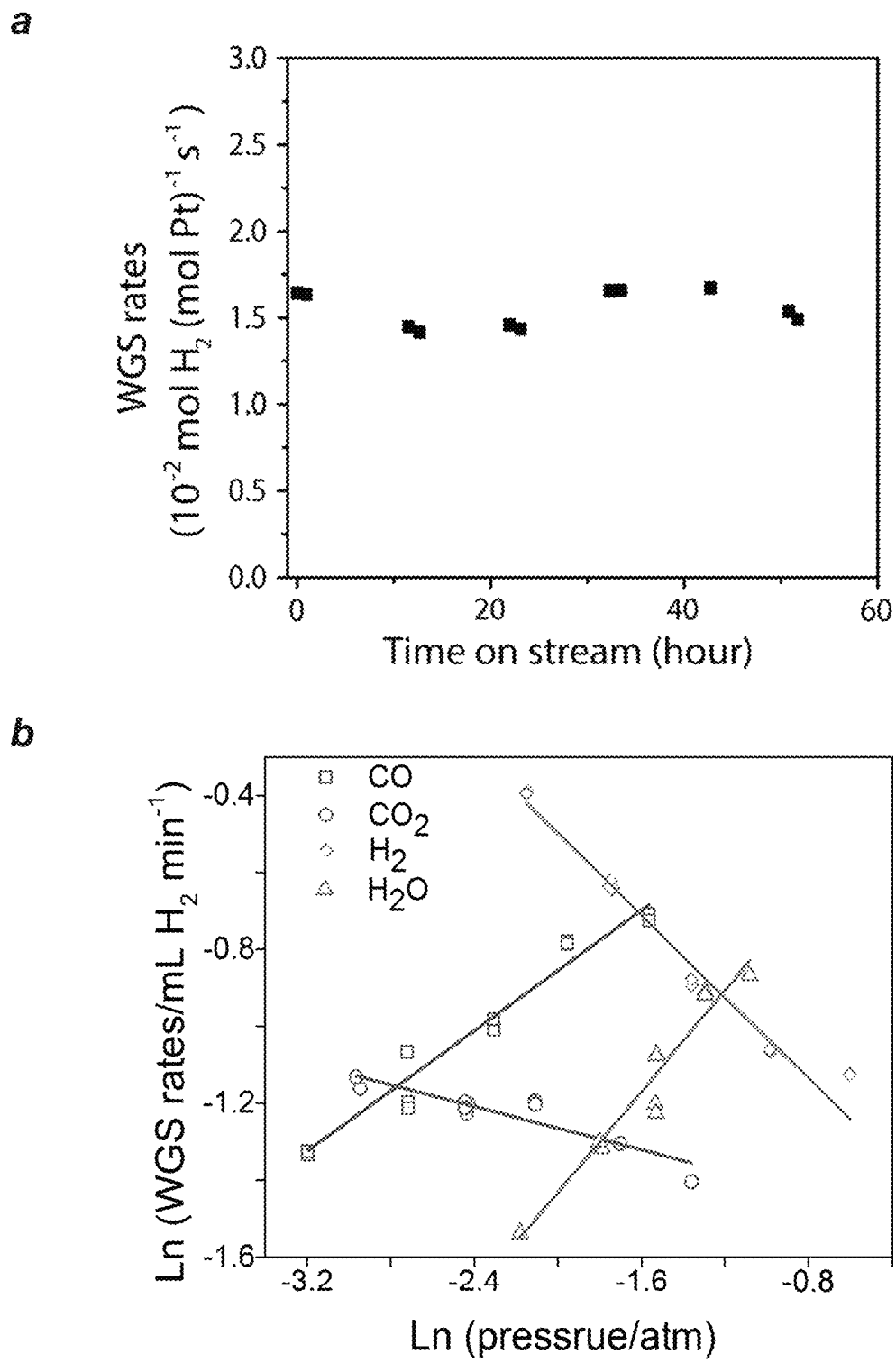
FIG. 2. Kinetics of the WGS reaction over 1% Pt/$Nb_2CT_x$ MXene catalyst. a, WGS rates normalized by amount of Pt in the 1% Pt/$Nb_2CT_x$ catalyst. The rates were measured at 300° C. with a feed composition of 6.8% CO, 21.9% $H_2O$, 8.5% $CO_2$, and 37.4% $H_2$ balanced by Ar (standard conditions). b, Apparent reaction orders for CO, $CO_2$, $H_2$, and $H_2O$ of 1% Pt/$Nb_2CT_x$. Order determination at standard conditions with each component varying in the range of 4-21% CO, 5-25% $CO_2$, 11-34% $H_2O$, and 14-55% $H_2$.
Figure 9:
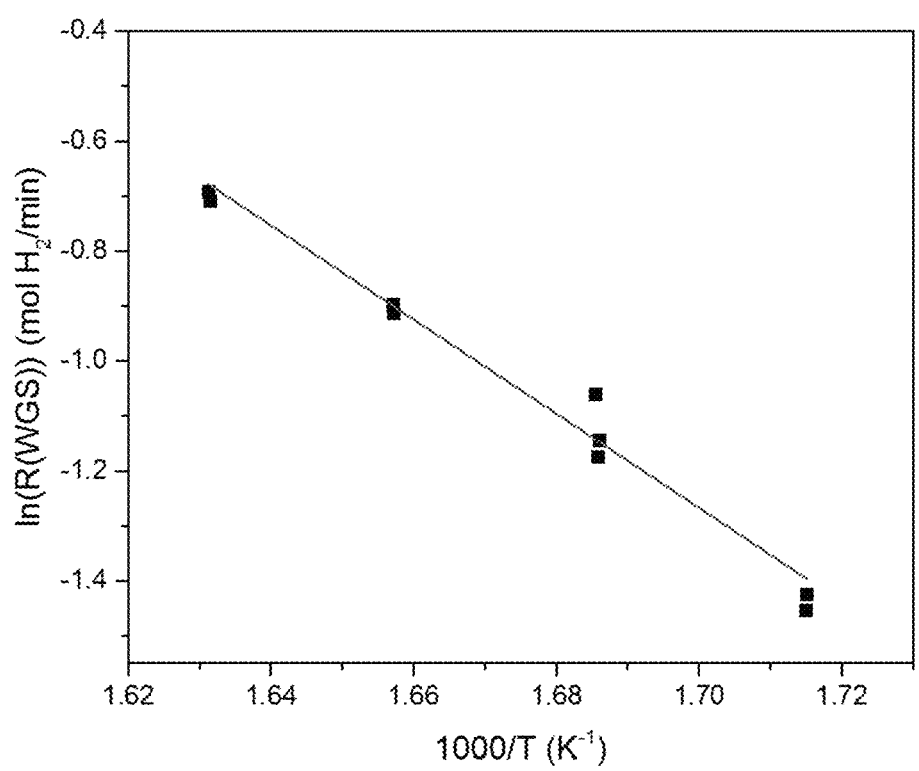
FIG. 9. Arrhenius plots for WGS over 1% Pt/$Nb_2CT_x$-MXene catalyst. The WGS rates were measured in presence of 7% CO, 22% $H_2O$, 8.5% $CO_2$, 37% $H_2$, and balance Ar.

Pt was loaded on the $Nb_2CT_x$ support via incipient-wetness impregnation (IWI) as reported in previous work (Sabnis et al., *J. Catal.* 331, 162-171 (2015)). The Pt loading was estimated to be 1% by atomic absorption spectroscopy (AAS). The 1% $Pt/Nb_2CT_x$ catalyst was then tested for WGS reaction under standard conditions (see Examples below), As shown in FIG. 2a, the catalyst is stable under the conditions used for the WGS reaction kinetic tests. The WGS rate per mole of metal for 1% $Pt/Nb_2CT_x$ measured at 300° C. is 0.016 mol $H_2$ (mol Pt)$^{-1}$ s$^{-1}$ and the activation energy is 70±3 kJ mol$^{-1}$ (FIG. 9). The spent 1% $Pt/Nb_2CT_x$ catalyst has an average particle size of approximately 2.6±0.6 nm based on high-angle annular dark field scanning transmission electron microscopy (HAADF-STEM), which showed that the MXene support stabilizes small Pt nanoparticles. We selected the 1.5% $Pt/Al_2O_3$ catalyst (Table 1) from our previous work (Shekhar, M., *Water-gas shift catalysis over supported gold and platinum nanoparticles*, PhD thesis, Purdue University (2012)) as the reference catalyst because the particle size (estimated by Pt dispersion) is comparable to that of the 1% $Pt/Nb_2CT_x$ catalyst.

The apparent reaction orders are shown and summarized in FIG. 2b and Table 1. As the log derivative analysis for Langmuir-Hinshelwood mechanisms shows, the apparent reaction order can be related to the corresponding relative surface coverage of the adsorbates. The lower orders of reaction for the reactants imply higher relative coverage of the adsorbed species. Compared to the $Pt/Al_2O_3$ catalyst, $Pt/Nb_2CT_x$ shows a higher apparent reaction order with respect to CO, which indicates that CO adsorption is weakened on the MXene supported catalyst. In the meantime, the $Pt/Nb_2CT_x$ catalyst exhibits a lower apparent reaction order with respect to $H_2O$, indicating the MXene support has a stronger $H_2O$ adsorption affinity compared to $Al_2O_3$ after the reduction of the surface groups. Previous studies agree that the support surface plays a significant role in the activation of $H_2O$ during WGS reaction and the most active site of WGS lies on the metal-support interface (Sabnis et al., *J. Catal.* 330, 442-451 (2015)). Here, the $Nb_2CT_x$ outperforms $Al_2O_3$ as support for WGS catalysts due to its stronger interaction with $H_2O$ or hydroxyl groups. The forward reaction order for $CO_2$ is slightly negative and approaches to zero for both the catalysts, which can be ascribed to the weak interaction between Pt surface and $CO_2$. The apparent reaction order with respect to $H_2$ is −0.5 for $Pt/Nb_2CT_x$, which is indicative of $H_2$ inhibition of the forward WGS reaction. The inhibition effect indicates that $H_2$ competes with CO for the limited active sites. See also, Li et al., *Nature Catalysis*, 2018, 1, 349-355 and its Supplementary Information, which is incorporated herein by reference.

TABLE 1

WGS kinetics of $Pt/Nb_2CT_x$ and $Pt/Al_2O_3$.

| Catalysts | WGS Rates per mole of Pt at 300° C./ 10$^{-2}$ mol $H_2$ (mol Pt)$^{-1}$ s$^{-1}$ | TOR at 300° C./ 10$^{-2}$ mol $H_2$ (mol surface metal)$^{-1}$ s$^{-1}$ | Ea/ kJ(mol)$^{-1}$ | $H_2O$ | $CO_2$ | CO | $H_2$ | Percentage of exposed Pt (%) |
|---|---|---|---|---|---|---|---|---|
| 1% $Pt/Nb_2CT_x$ MXene | 1.6 | — | 71 | 0.65 | −0.09 | 0.39 | −0.47 | — |
| 1.5% $Pt/Al_2O_3$ | 1.4 | 4 | 96 | 0.9 | −0.1 | 0.1 | −0.5 | 35 |

Moreover, $Al_2O_3$ is considered a non-reducible oxide at the moderate reduction temperature (350° C.) in contrast to the reducible $Nb_2CT_x$ support. Although, according to CO chemisorption, 35% of the Pt was exposed on the surface of the 1.5% $Pt/Al_2O_3$ catalyst, we did not observe any measurable CO uptake at ambient temperature or at −30° C. for the fresh 1% $Pt/Nb_2CT_x$ catalyst after it was reduced in situ at 350° C. The suppressed CO chemisorption is not due to particle agglomeration, and the average particle size of 1% $Pt/Nb_2CT_x$ should have corresponded to an estimated dispersion of 38%. This large discrepancy can be attributed to surface alloy formation due to the reducible surface of the niobium MXene-supported catalyst, as discussed below. No measurable WGS conversion was observed for Pt supported by commercial NbC (bulk) under the same WGS test conditions. We found that the Pt particles had sintered significantly (average particle size ~13.8±9.6 nm) in the Pt/NbC (bulk) catalyst. The agglomeration of nanoparticles substantially reduces the number of metal-support interface sites, which presumably leads to the observed loss in WGS activity.

Reducibility of the $Pt/Nb_2CT_x$ Catalyst.

To understand the change upon $Nb_2CT_x$ MXene support after $H_2$ reduction, a series of Quasi in situ X-ray photoelectron spectroscopy (XPS) and Nb edge XAS experiments were carried out. In Nb 3d spectrum of fresh $Pt/Nb_2CT_x$ sample (FIG. 3a), three pairs of peaks at 204.1/206.8, 205.5/208.3 and 207.4/210.1 eV are identified as the 3d$_{5/2}$/3d$_{3/2}$ doublets of Nb—C, $NbC_xO_yF_z$ and $Nb_2O_5$, respectively. After reducing the fresh $Pt/Nb_2CT_x$ sample at 350° C. or 550° C. (designated as R350° C. and R550° C., respectively), the component for $NbC_xO_yF_z$ is absent, which indicates the effective removal of the functional groups terminated on the surface of the support. This is consistent with our TPR results and suggests that the carbide surface is reducible. The negligible change in peaks corresponding to carbide indicates the structure of the $Nb_2CT_x$ MXene was preserved during the reduction at both 350° C. and 550° C. However, after exposing the reduced sample to air, a remarkable decrease of the carbide peak intensity is observed while the Nb (V) oxide peak becomes well-resolved (FIG. 3a), which implies an enrichment of oxide species on the surface.

Figure 11:
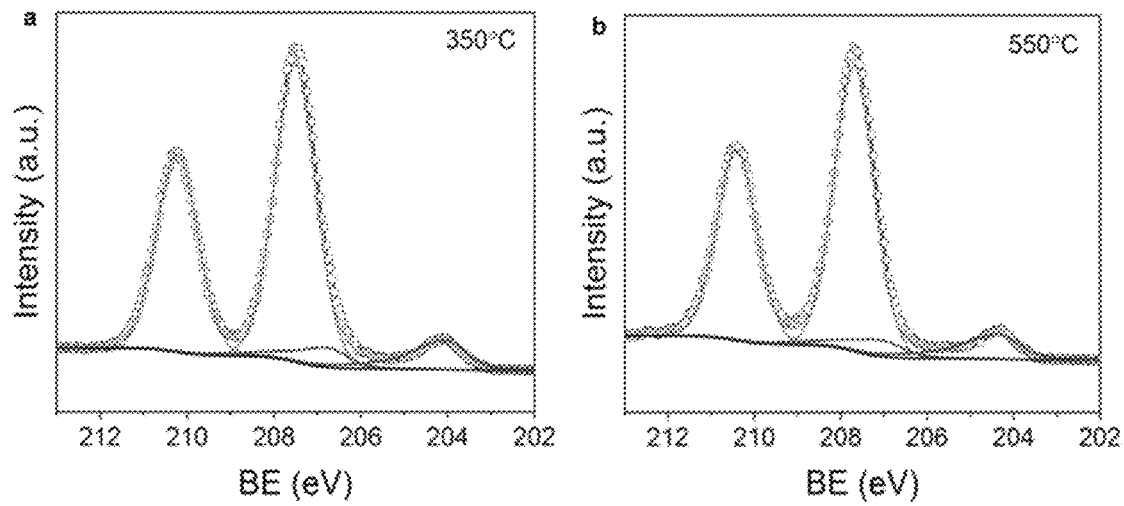
FIG. 11. Quasi in situ XPS spectra of Nb 3d of pre-reduced 1% Pt/$Nb_2CT_x$ sample (the fresh sample was reduced at 350° C. by $H_2$ and then exposed to air before the quasi in-situ XPS measurement) reduced at 350° C. and 550° C.

With the removal of surface functional groups of the MXene, the coordinatively unsaturated surface is prone to oxidation in air. Moreover, the enriched oxide species is irreducible by $H_2$ at both 350° C. and 550° C. (FIG. 11), which may encapsulate the active sites and lead to the suppressed CO chemisorption.

Figure 3:
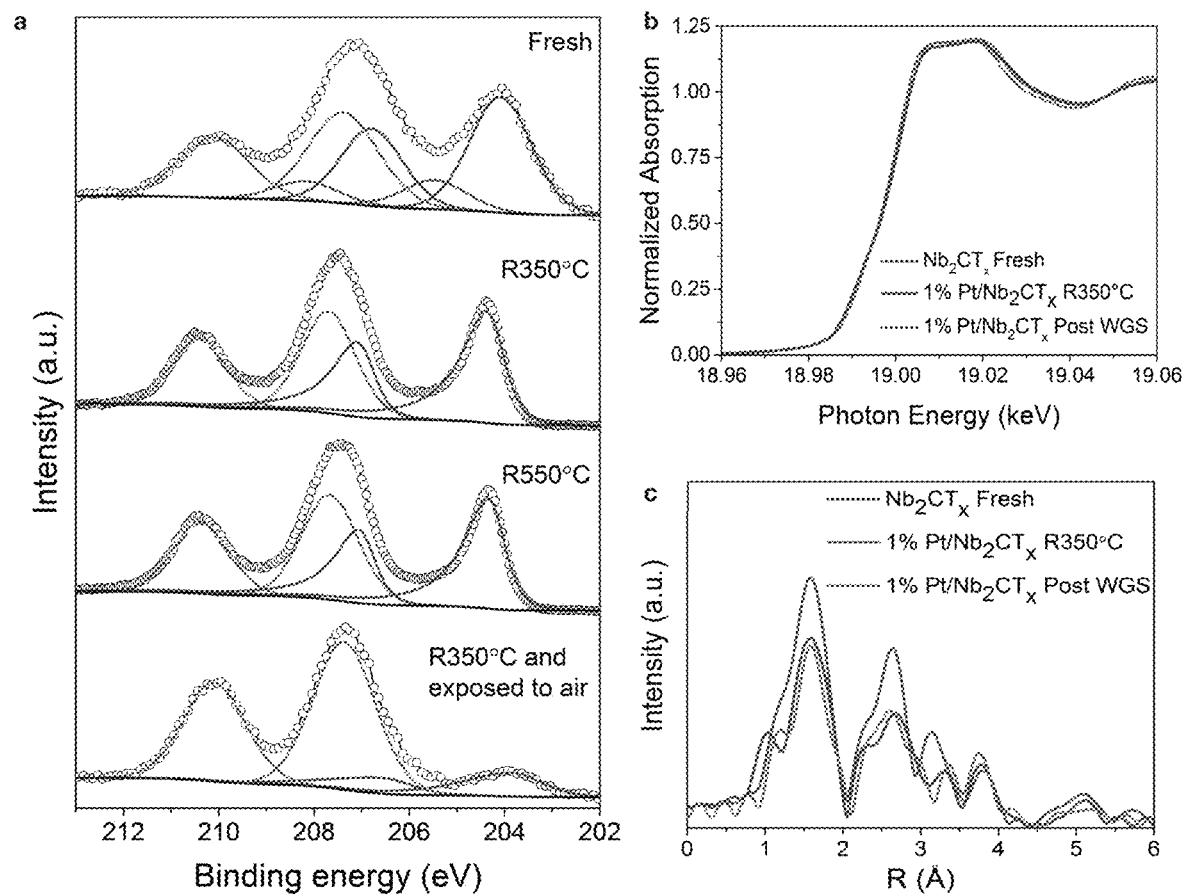
FIG. 3. Nb 3d XPS measurements and Nb edge XAS of Pt/$Nb_2CT_x$ catalysts. a, Ex situ XPS spectra of Nb 3d for fresh 1% Pt/$Nb_2CT_x$ sample and Quasi in situ XPS for 1% Pt/$Nb_2CT_x$ reduced at 350° C. and 550° C. and Ex situ XPS for 1% Pt/$Nb_2CT_x$ reduced at 350° C. and exposed to air before the measurement. b, XANES spectra of Nb K-edge for fresh $Nb_2CT_x$ (blue) scanned in air and in situ XANES spectra for fresh 1% Pt/$Nb_2CT_x$ treated in 3% $H_2$/He at 350° C. (red) and XANES spectra for post WGS 1% Pt/$Nb_2CT_x$ catalyst scanned in air (green). c, Fourier transform magnitude of the $k^2$ EXAFS for fresh $Nb_2CT_x$ and reduced fresh 1% Pt/$Nb_2CT_x$ and post WGS 1% Pt/$Nb_2CT_x$ catalyst, all treatments are the same with XANES spectra.
Figure 12:
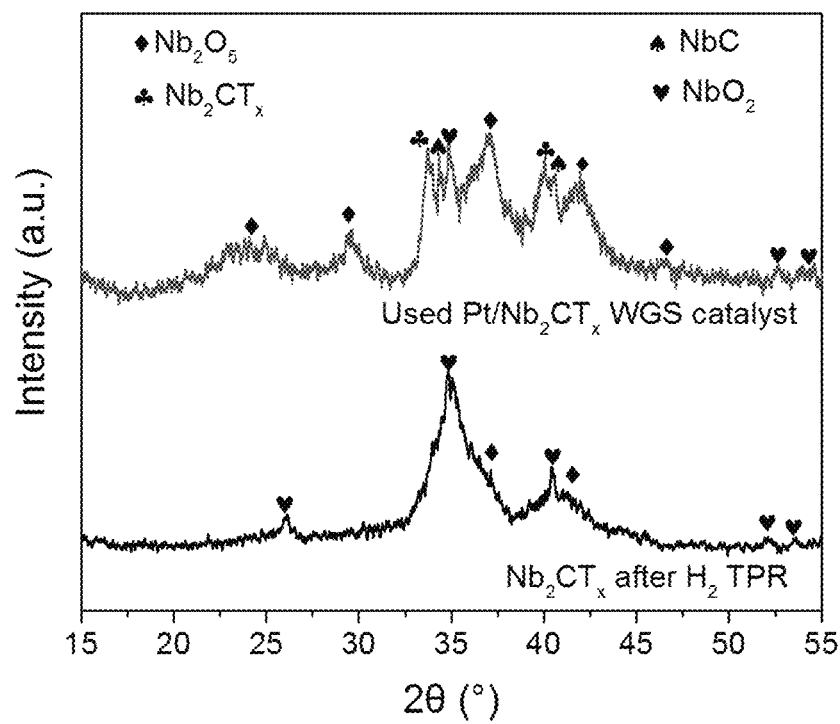
FIG. 12. XRD pattern of spent 1% Pt/$Nb_2CT_x$ catalyst after WGS reaction (red/upper line) and $Nb_2CT_x$ MXene after TPR treatment (black/lower line).

We further compared the fresh Pt/$Nb_2CT_x$ sample with the Pt/$Nb_2CT_x$ after different treatments utilizing XAS (FIG. 3c-d). In both the samples reduced by $H_2$ at 350° C. and after WGS reaction, the supports remain the same carbide structure matrix compared to the fresh Pt/$Nb_2CT_x$, as shown by minimal change in the XANES spectra. The scattering intensity in EXAFS slightly decreases, likely corresponding to the decrease in the number of ligands on surface of $Nb_2CT_x$. The spent catalyst still preserved the typical accordion-like structure of MXene (FIG. 6b) and characteristic diffraction of the carbide (FIG. 12), indicating the MXene support did not collapse during the WGS reaction. Hence our results indicate the structure of $Nb_2CT_x$ is maintained during the reduction and WGS reaction while the surface of $Nb_2CT_x$ is reducible and subjected to oxidation after exposure to air. The reducibility of $Nb_2CT_x$ support is indicative of its potential to introduce significant metal-support interaction to the catalyst.

Reactive Metal-Support Interaction (RMSI).

Figure 4:
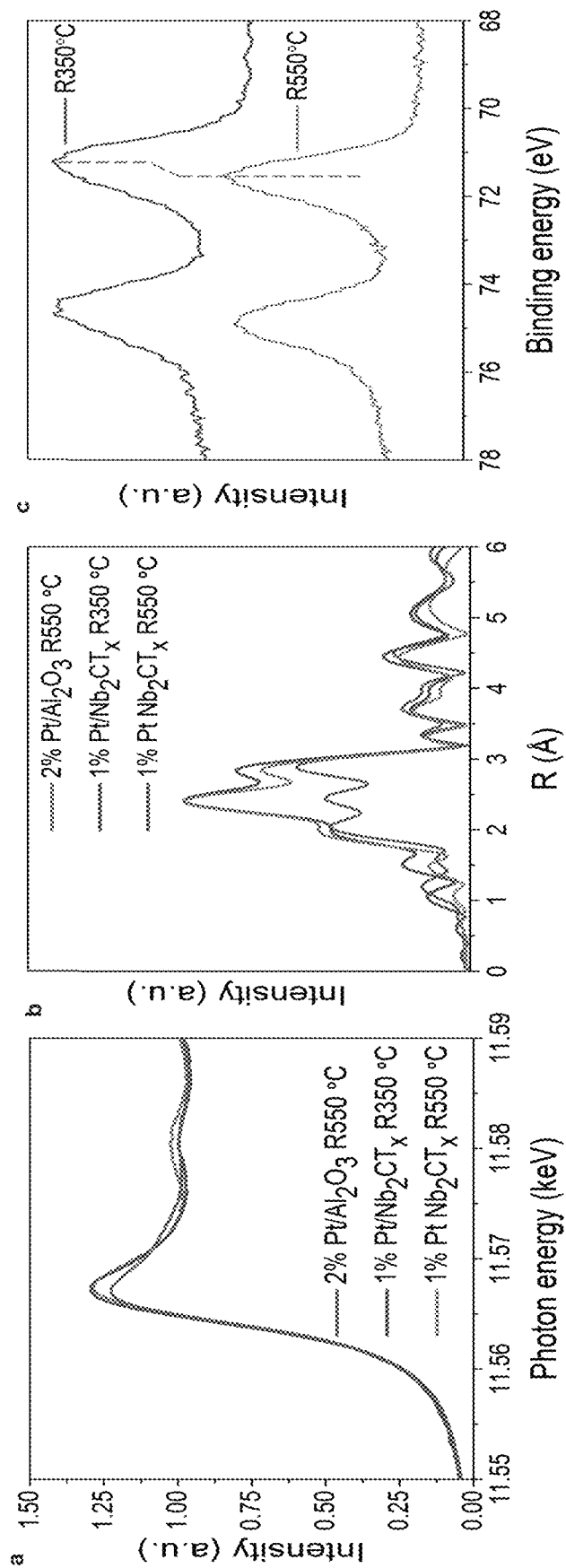
FIG. 4. In situ XAS and quasi in situ XPS of 1% Pt/$Nb_2CT_x$ catalysts. a, in situ XANES spectra of Pt $L_{III}$ edge for 2% Pt/$Al_2O_3$ sample treated at 550° C. (blue) and fresh 1% Pt/$Nb_2CT_x$ treated at 350° C. (red) and 550° C. (green) in 3% $H_2$/He. b, Fourier transform magnitude of the $k^2$ EXAFS for 2% Pt/$Al_2O_3$ sample treated at 550° C. and fresh 1% Pt/$Nb_2CT_x$ treated at 350° C. and 550° C. in 3% $H_2$/He. c, Quasi in situ XPS spectra of Pt 4f for reduced 1% Pt/$Nb_2CT_x$ sample at 350° C. (red; upper line) and 550° C. (green; lower line).

The interaction of Pt with $Nb_2CT_x$ support and corresponding changes in the nanoparticles are further investigated by in situ Pt $L_{III}$ edge XAS as well as quasi in situ XPS. For the Pt $L_{III}$ edge XANES (FIG. 4a), the whiteline of 1% Pt/$Nb_2CT_x$ catalysts reduced at 350° C. is higher in intensity and narrower in shape compared to that of 2% Pt/$Al_2O_3$, implying the presence of non-Pt neighbors around Pt. Change in the nanoparticle structure is also reflected by the altered EXAFS (FIG. 4b) of Pt/$Nb_2CT_x$ catalyst compared to monometallic Pt on $Al_2O_3$. The relative intensity of different peaks changes in the metal-metal distance region, suggesting that Pt—Pt scattering is interfered by Pt—Nb, i.e. formation of bimetallic structure. Stronger evidence is observed from EXAFS of Pt/$Nb_2CT_x$ sample reduced at higher temperature (550° C.), which is substantially different from that of Pt/$Nb_2CT_x$ reduced at 350° C. because of the incorporation of larger amount of Nb in the nanoparticles.

Figure 13:
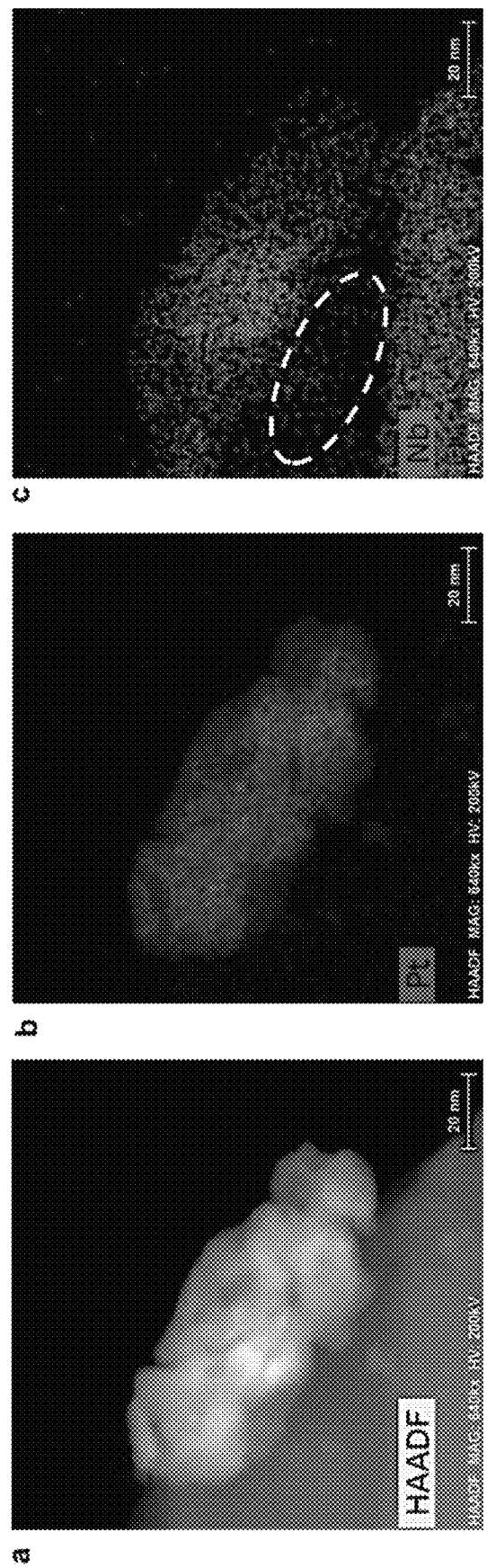
FIG. 13. (a) HAADF-STEM Electron micrographs of fresh 1% Pt/$Nb_2CT_x$ catalyst reduced in 5% $H_2$/$N_2$ at 550° C. Particle agglomerates after the high temperature (550° C.) reduction. (b) Elemental mapping of Pt. (c) Elemental mapping of Nb, and a Nb deficient area is circled out by white dash line.

Fitting the spectra gives 6 Pt—Pt bonds and 3 Pt—Nb bonds both at 2.76 Å, consistent with a structure of $L1_2$ type $Pt_3Nb$ intermetallic alloy. The alloy formation is further confirmed by high angle annular dark field scanning transmission electron microscopy (HAADF-STEM) with X-ray spectroscopy (EDS) elemental mapping (FIG. 13). The formation of intermetallic alloys start from the surface layer before the whole particle is transformed. Our fitting results of the Pt/$Nb_2CT_x$ reduced at 350° C. (7.7 Pt—Pt bond at 2.75 Å and 0.9 Pt—Nb bond at 2.76 Å) therefore imply partial our surface bimetallic alloy is formed at this mild temperature. Quasi in situ XPS spectra (FIG. 4c) of reduced 1% Pt/$Nb_2CT_x$ shows Pt $4f_{7/2}$ component has binding energies equal to 71.2 eV and 71.6 eV for samples reduced at 350° C. and 550° C., respectively, and the shift can be caused by electronic modification of the Pt sites due to the formation of alloy, in agreement with previous work (Wakisaka et al., *J. Phys. Chem. B* 110, 23489-23496 (2006)). The different binding energies imply the degree of alloy formation depends on temperature, which is consistent with our in situ XAS result.

Figure 5:
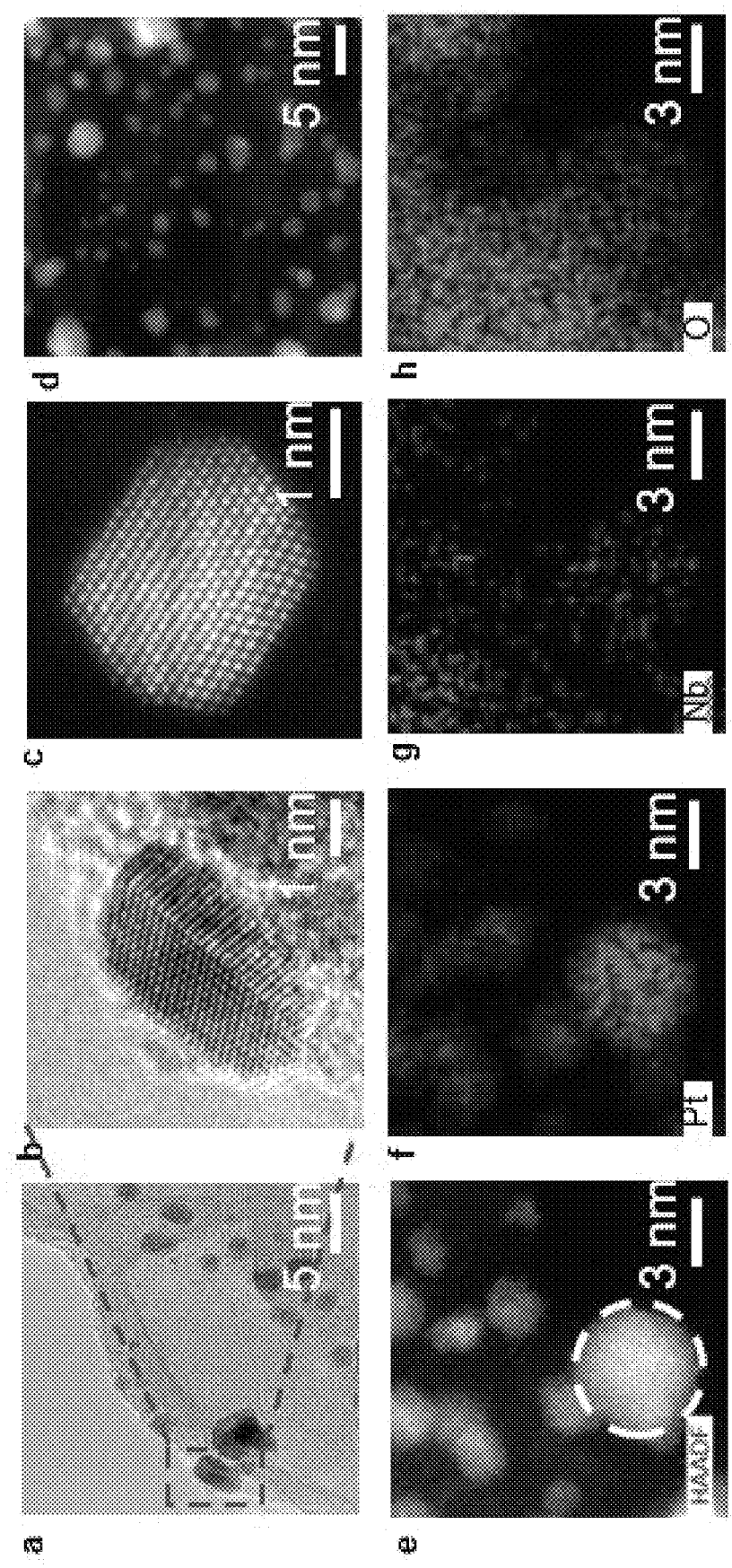
FIG. 5. HRTEM and HAADF-STEM characterizations a of spent 1% Pt/$Nb_2CT_x$ catalyst. a,b, HRTEM images of post WGS 1% Pt/$Nb_2CT_x$ catalyst showing nanoparticle with twin boundary. c-e High-resolution HAADF-STEM images of post WGS 1% Pt/$Nb_2CT_x$ catalyst. f-h, Elemental mappings of Pt (f), Nb (g), and O (h).

The observation of alloy formation confirms that reducing the catalyst introduces RMSI between Pt and $Nb_2CT_x$ support, and the details of the metal support interaction is further characterized by HRTEM and HAADF-STEM with EDS. FIG. 5a-b display a typical twined platinum particle with part of it hanging over the vacuum and the other part accommodated on the support. A similar truncated cuboctahedron nanoparticle is also atomically resolved by HAADF-STEM (FIG. 5c). In FIG. 5d, the nanoparticle in focus shows lattice fringes, suggesting good crystallinity. EDS was also acquired on a nanoparticle (FIG. 5e) partially attached to the $Nb_2CT_x$ MXene support, which helped avoid background signal from the support. The EDS elemental maps of Pt (FIG. 5f), Nb (FIG. 5g), and O (FIG. 5h) demonstrate the overlap of Pt, Nb and O elements with a circle outline matching the metal nanoparticle of interest (circled out using white dashline). Therefore, the enrichment of Nb and O at the same location as the metal nanoparticle suggests that the nanoparticle is encapsulated by $NbO_x$.

Combining the XAS and XPS results, this layer most likely originates from oxidation of the surface Nb from the Pt—Nb surface alloy formed after reduction at 350° C., since Nb is much easier to be oxidized than Pt due to its much higher O affinity. While the $NbO_x$ over-layer observed is similar to classical SMSI phenomenon, we propose the over-layer results from oxidation of the metallic surface alloy that is present in the reductive atmospheres of WGS reaction, not the migration of the oxide. The enriched oxide species on the metal nanoparticle hanging over the vacuum also indicates the diffusion of reduced Nb species, which may be a pivotal step of alloy formation. Additionally, the EDS maps on the samples reduced at 550° C. (FIG. 13c) shows a Nb deficient area right below the metal nanoparticle (circled out with white dashline), suggesting the redistribution of Nb element after reduction. This result implies that the reduced Nb species migrate into Pt to form the intermetallic compound, which is consistent with previous reports (Penner et al., *ChemCatChem* 7, 374-392 (2015)).

The above results show that Pt—Nb alloy supported on a MXene carbide surface is formed through RMSI, which explains the altered WGS performance on the Pt/$Nb_2CT_x$ catalyst. The partial or surface Pt—Nb alloy binds CO weaker compared to Pt according to prior work, leading to higher CO order (0.4, 300° C.) compared to Pt/$Al_2O_3$ (0.1, 300° C.) and corresponding lower CO coverage during the WGS reaction. Surface O, OH and F terminations of $Nb_2CT_x$ MXene is reducible by $H_2$ at 350° C. and the resulting surface is apt to be oxidized by air. The niobium oxide species enriched on the catalyst surface may encapsulate the active sites. Therefore, the low Pt dispersion of the Pt/$Nb_2CT_x$ catalyst determined by CO chemisorption can be explained by the bimetallic alloy formation as well as the enrichment of irreducible $NbO_x$ that impedes available active sites for the chemisorption.

With the removal of the surface functional groups, the reduced MXene surface forms active interfaces with the bimetallic alloy for dissociating $H_2O$. The lower $H_2O$ order implies a stronger OH or $H_2O$ affinity on Pt/$Nb_2CT_x$ catalyst. Metal-support interface has often been thought to be responsible for $H_2O$ dissociation and thus the bimetallic alloy-$Nb_2CT_x$ MXene interface shows enhanced $H_2O$ activation as compared to Pt/$Al_2O_3$. Overall, apparent activation energy changes (Pt/$Nb_2CT_x$ (71 kJ $mol^{-1}$), Pt/$Al_2O_3$ (96 kJ $mol^{-1}$)) because of the modified nature of active sites.

We have therefore demonstrated that the surface of 2D $Nb_2CT_x$ MXene can be reduced at moderate temperature (350° C.) to enter a RMSI state with Pt nanoparticles. The RMSI induces formation of bimetallic alloy that modifies CO adsorption and admetal-$Nb_2CT_x$ interface for WGS reaction. In-situ spectroscopy results show the intermetallic alloy formation is temperature dependent, which is likely initiated from the surface of the nanoparticles. Such RMSI formed on the niobium MXene can also apply to other members of the MXene family, which will open a new horizon for designing bimetallic catalysts.

Alkane Dehydrogenation on $Pt/Ti_3C_2T_x$, $Pt/Nb_2CT_x$ Catalysts.

Figure 23:
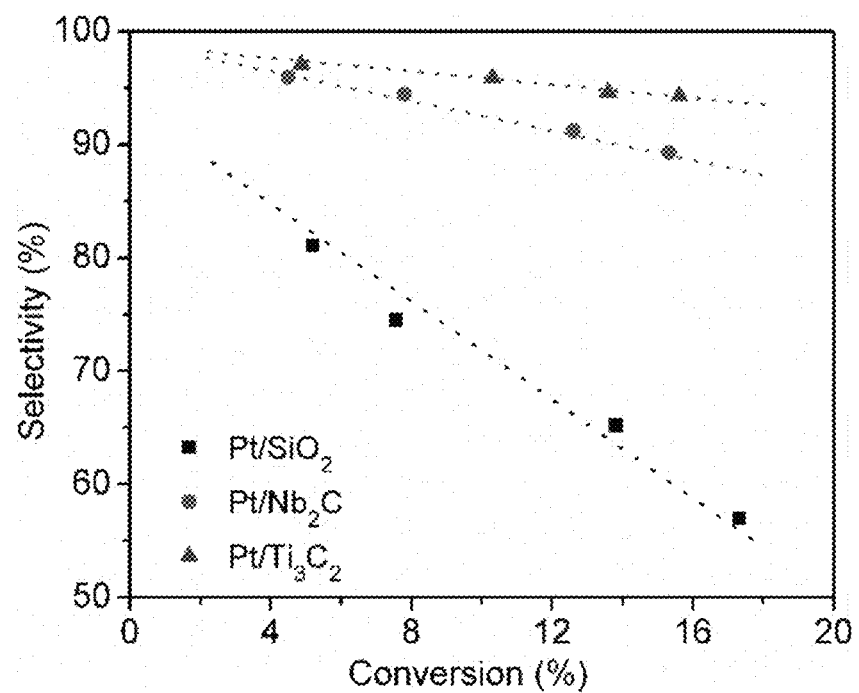
FIG. 23. Plots of conversion vs. selectivity, and time on stream vs. conversion and selectivity, of propane dehydrogenation measured in 200 $cm^3$/min of 2.5% $C_3H_8$, 2.5% $H_2$ balanced in $N_2$ at 1.5 atm and 550° C. for $Pt/Ti_3C_2$ and $Pt/Nb_2C$ catalyst, compared to $Pt/SiO_2$, which has conversion and selectivity.
Figure 23:
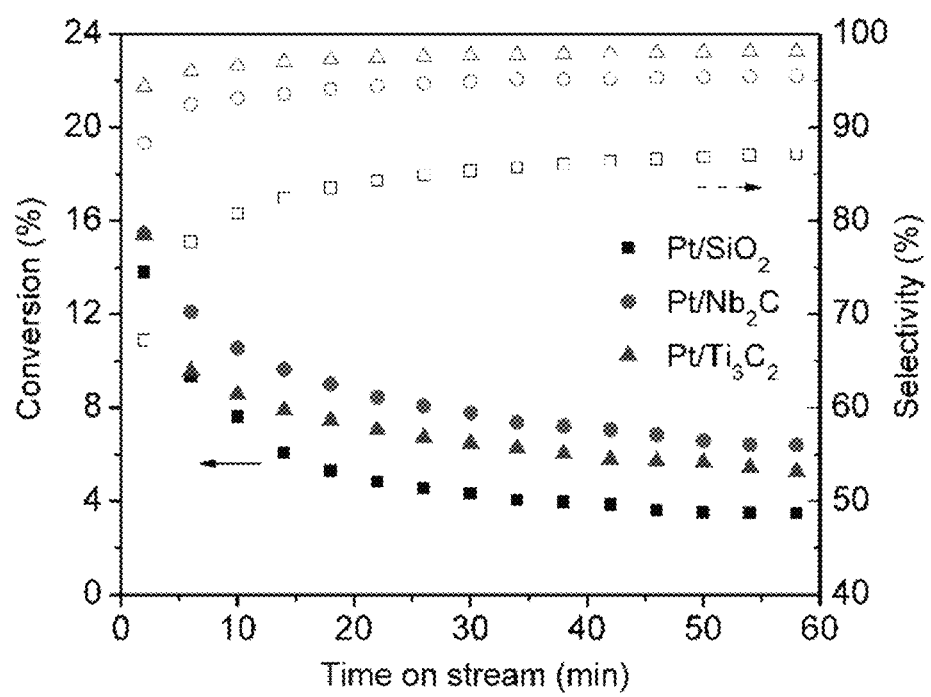

According to d band chemisorption theory, shifts to lower energy of d band center will reduce the surface adsorption reactivity and directly affect the chemistry of catalysts. Light alkane dehydrogenation (LADH) reactions are sensitive to the energy level of d band electrons of the catalysts surface, thus were used as probes to evaluate effects of the in situ formation of $Pt_3M$ intermetallic NPs on the catalytic performance. All the catalysts were pretreated and tested under the same conditions summarized in Examples below. The product selectivity of different catalysts was compared between 0 and 20% light alkane conversions. The results are shown in FIG. 23 (top graph). For both dehydrogenation of propane and isobutane, Pt/MXene catalysts are much more selective than $Pt/SiO_2$ at the same conversion. For example, when the conversion of propane is 15%, $Pt/SiO_2$ is 60% selective to propylene, while those of $Pt/Ti_3C_2T_x$ and $Pt/Nb_2CT_x$ are ~95% and 90%, respectively.

Figure 24:
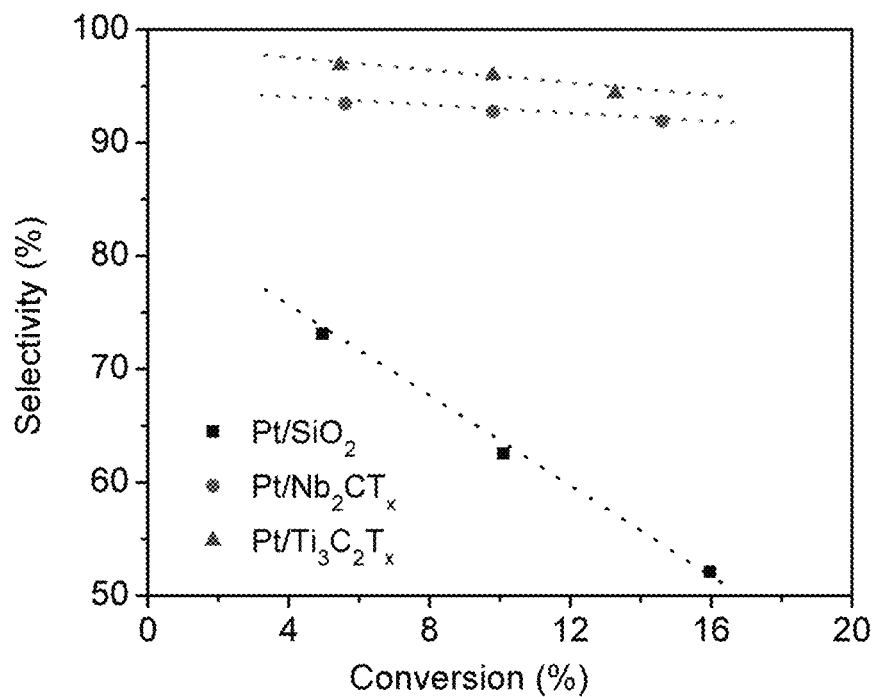
FIG. 24. Plots of conversion vs. selectivity, and time on stream vs. conversion and selectivity, of isobutane dehydrogenation measured in 200 $cm^3$/min of 2.5% $C_4H_{10}$, 2.5% $H_2$ balanced in $N_2$ at 1.5 atm and 550° C. for $Pt/Ti_3C_2$ and $Pt/Nb_2C$ catalyst.
Figure 24:
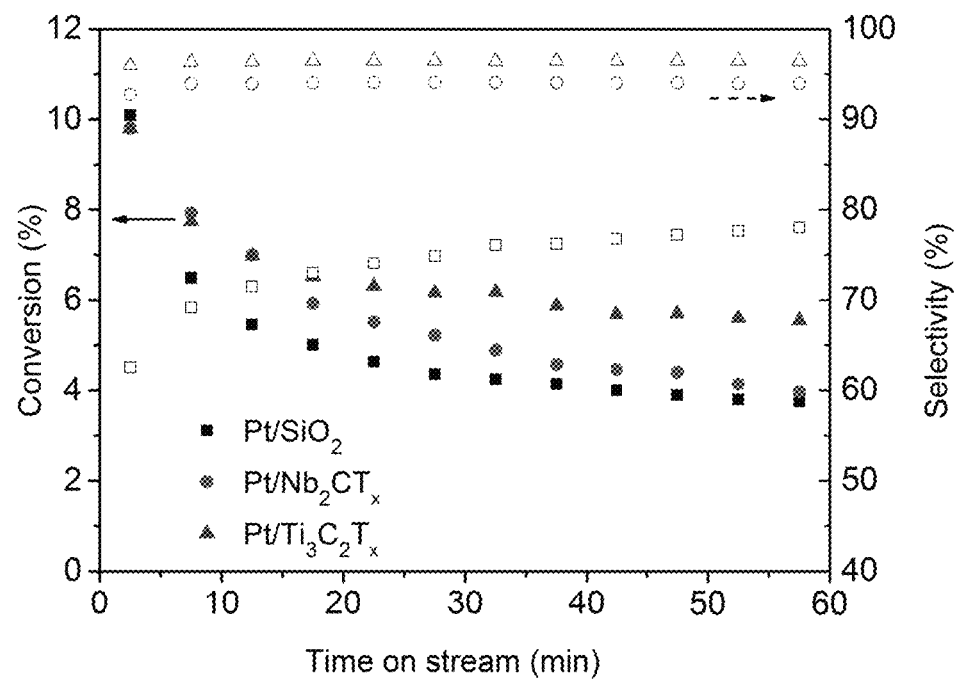

Though intermetallic catalysts have larger particle size compared to the reference monometallic Pt catalyst, the improvement in their catalytic performance can be attributed to the formation of intermetallic structure rather than a size effect since larger particles have been reported to give lower selectivity. Similar improvements were also observed for isobutane dehydrogenation (FIG. 24). For all the catalysts, the selectivity of dehydrogenation is lower at higher conversion due to the hydrogenolysis side reaction that requires hydrogen. The decrease in selectivity under increasing conversion is reduced on the $Pt/Ti_3C_2T_x$ and $Pt/Nb_2CT_x$ catalysts, indicating that the effect of side reactions is less prominent on the intermetallic NPs, as shown in FIG. 23 (bottom graph).

The TORs were calculated using the reaction rate per gram of Pt measured under differential conditions and catalyst dispersion estimated from the average particles sizes. For propane dehydrogenation (PDH), the TORs were 0.12 $s^{-1}$, 0.09 $s^{-1}$ and 0.08 $s^{-1}$ for $Pt/SiO_2$, $Pt/Nb_2CT_x$ and $Pt/Ti_3C_2T_x$, respectively. The TORs for isobutane dehydrogenation followed a similar trend and were 0.09 $s^{-1}$, 0.06 $s^{-1}$ and 0.06 $s^{-1}$ for $Pt/SiO_2$, $Pt/Nb_2CT_x$ and $Pt/Ti_3C_2T_x$. These values are similar to the TORs reported for typical LADH catalysts. The evolution of performance with time on-stream for intermetallic compound (IMC) catalysts are also consistent with the monometallic Pt catalyst as well as previous literature, due to slow deposition of coke. The used $Pt/Nb_2CT_x$ and $Pt/Ti_3C_2T_x$ were further characterized by HAADF-STEM to check the stability of the IMCs. The structures of $Pt_3Ti$ and $Pt_3Nb$ are preserved in the spent catalysts, indicating that the IMCs NPs were stable under the LADH reaction conditions.

To understand the high olefin selectivity of the intermetallic catalysts for PDH reaction, energy profiles of PDH reaction and possible side reactions were studied by DFT calculations. Snapshots of structures of reaction intermediates and transition states were created, with the free energies of the relevant reaction pathways on Pt(111) and $Pt_3Ti(111)$ surfaces calculated. PDH follows a step-wise C—H bond breaking process, which starts with dissociative adsorption of propane forming surface alkyl species, followed by the scission of a secondary C—H bond generating adsorbed olefins.

Our experimental results and DFT calculations show that the $Pt_3Ti$ intermetallic phase has a lower d band center compared with that of monometallic Pt, which results in weaker adsorption of light hydrocarbon species and changes of the relative free energy and barriers of the reaction steps during dehydrogenation and side reactions. Lowering of the olefin desorption barrier to below that of deep dehydrogenation and C—C breaking contributes to the high catalyst selectivity. The same type of calculations was not conducted for the $Pt/Nb_2CT_x$ catalyst due to its relatively less well-defined structure. However, similar catalyst electronic structure compared to $Pt/Ti_3C_2T_x$ can be expected according to the in-situ X-ray spectroscopy results. The adsorption properties, and reaction energetics are, therefore, also expected to be similar. The fact that the $Pt/Nb_2CT_x$ catalyst has a slightly lower selectivity compared to $Pt/Ti_3C_2T_x$ is likely due to the extent of the IMCs formation, i.e., full verses surface IMCs, and differences in electronic effects. These additional subtle catalytic differences demonstrate that the chemical properties of the catalysts are tunable using different MXene materials as the RMSI-active supports.

In summary, this work demonstrates two IMC catalysts selective for LADH achieved by RMSI between Pt NPs and $Ti_3C_2T_x$ and $Nb_2CT_x$ MXenes. The intermetallic surface is imaged by atomic resolution HAADF-STEM and its high catalytic selectivity is rationalized by DFT calculations. With MXenes as catalyst supports and through their active interactions with metal NPs, there is an opportunity to explore many new compositions for heterogeneous catalysis in industrial gas-phase reactions as well as electrochemical conversion, with the possibility that the chemical and electronic properties of the resulting catalysts can be tuned over a wider range than what is currently possible using conventional catalyst supports.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Example 1. Catalyst Preparation

Synthesis of $Nb_2AlC$ phase: The $Nb_2AlC$ powder is synthesized by spark plasma sintering (SPS) of Nb/Al/graphite mixtures. In detail, commercial powders of Niobium (99.8%, 325 mesh), graphite (99%, 7-11 μm) and aluminum (99.5%, 325 mesh) were mixed with a molar ratio of Nb:Al:C=2:1.4:0.9 in a graphite die coated with boron nitride (BN). Excess Al and less graphite were added because Al will be lost during high-temperature processing and carbon deficiencies exists in most Al-containing MAX phases. Then the tooling was loaded in a Fuji-211lx SPS system and sintered at 1500° C. under 30 MPa for one hour. The resulting $Nb_2AlC$ was then pulverized and sieved through a 325-mesh screen.

Preparation of $Nb_2CT_x$ MXene: Roughly 1 g of the prepared $Nb_2AlC$ powder was immersed into 10 mL of 50% aqueous hydrofluoric acid (HF) solution for around 3 days at 55° C. The resulting MXene suspension was repeatedly washed with deionized water (DI) and centrifuged at 8900 rpm until the pH reached ~5. The final MXene was dried under vacuum at room temperature and placed in a glove box for future usage.

Preparation of Pt/Nb$_2$CT$_x$ catalysts: Tetraamine platinum nitrate (Sigma-Aldrich, 99.995%) was loaded on Nb$_2$CT$_x$ MXene support by incipient-wetness impregnation method (IWI). Specifically, a certain amount of Pt precursor was dissolved in deionized water to make a solution with a concentration of 0.02 g Pt/mL. The solution was then added dropwise to the support until incipient-wetness (about 0.5 mL per gram of support). The mixture was then dried under vacuum at ambient temperature. The procedure was repeated once so the final catalyst (denoted as Pt/Nb$_2$CT$_x$ fresh) had a Pt loading around 1-2% empirically.

Synthesis of Ti$_3$AlC$_2$ phase: The Ti$_3$AlC$_2$ powder was synthesized by spark plasma sintering (SPS) of TiH$_2$/Al/TiC. Commercial powders of titanium(II) hydride, aluminum and titanium(IV) carbide were mixed in a molar ratio of TiH$_2$/Al/TiC=1:1:1.8 in a graphite die coated with boron nitride (BN). Excess Al and less than a full equivalent of TiC were added because a small portion of Al will be lost during high-temperature processing, and carbon deficiencies exist in most Al-containing MAX phases. Then, the material was loaded in a Fuji-211lx SPS system and sintered at 1350° C. under 30 MPa for one hour. The resulting Ti$_3$AlC$_2$ was then pulverized and sieved through a 325-mesh screen.

Preparation of Ti$_3$C$_2$T$_x$ MXene: Approximately 1 g of the prepared Ti$_3$AlC$_2$ powder was immersed in 10 mL of 50% aqueous hydrofluoric acid solution stirred with a magnetic bar for approximately 1 day at 35° C. The resulting MXene suspension was repeatedly washed with deionized water (DI) and centrifuged at 8900 rpm until the pH reached ~5. The final MXene was dried under vacuum at room temperature and stored in a glove box until usage.

Preparation of Pt/SiO$_2$ catalysts: A monometallic Pt catalyst (2 wt. % Pt supported on Davisil 636 silica gel from Sigma-Aldrich, 480 m$^2$/g and 0.75 mL/g pore volume) was synthesized using the incipient wetness impregnation (IWI) method. 0.20 g of tetraammineplatinum nitrate Pt(NH$_3$)$_4$(NO$_3$)$_2$ (Sigma-Aldrich) were dissolved in 3 mL of H$_2$O. 30% ammonium hydroxide solution (Sigma-Aldrich) was then added to the solution until the pH reached 11 to provide a Pt precursor solution. The obtained Pt precursor solution was added dropwise to 5 g of silica and stirred. After drying overnight at 125° C., the sample was calcined at 225° C. for 3 h and reduced at 550° C. in 5% H$_2$/N$_2$ at 100 cm$^3$/min for 30 minutes to provide Pt/SiO$_2$.

Preparation of Pt/Ti$_3$C$_2$T$_x$ catalysts: Pt supported on Ti$_3$C$_2$T$_x$ and on Nb$_2$CT$_x$ were prepared via a similar method as used for preparing the Pt/SiO$_2$ catalyst. 0.20 g of tetraammineplatinum nitrate Pt(NH$_3$)$_4$(NO$_3$)$_2$ were dissolved in 0.5 mL of H$_2$O to prepare 1M/L Pt precursor solution. 0.05 mL of such solution was impregnated on fresh Ti$_3$C$_2$T$_x$ and Nb$_2$CT$_x$, respectively, prior to dying overnight under vacuum. The obtained catalysts were reduced at 550° C. in 5% H$_2$/N$_2$ at 100 cm$^3$/min for at least 0.5 h before each catalytic test or characterization.

Example 2. Measurement of the WGS Reaction Kinetics

The WGS reaction was measured in a parallel plug flow reactor which was described previously (Bollmann et al., *J. Catal.* 257, 43-54 (2008)). The WGS reaction rates were measured under differential conditions, namely conversion was maintained below 10% and the products of the WGS reaction (CO$_2$ and H$_2$) were also co-fed. The WGS rate was expressed in a power rate law as below:

$$r = A\exp\left(-\frac{E_{app}}{RT}\right)[CO]^a[CO_2]^b[H_2]^c[H_2O]^d(1-\beta) \quad (1)$$

where r is the overall rate, A and E$_{app}$ are the apparent pre-exponential factor and activation energy for the forward rate, a, b, c and d are forward reaction orders, $\beta=([CO_2][H_2])/(K_{eq}[CO][H_2O])$ is the approach to equilibrium, which measures the deviance from the equilibrium conditions and K$_{eq}$ is the equilibrium constant for the WGS reaction. At the WGS conditions tested here, $\beta \ll 1$, implying the reaction is far from equilibrium.

For each measurement, c.a. 300 mg of the as-prepared Pt/Nb$_2$CT$_x$ catalyst was loaded in the reactor. The catalyst was pretreated by reduction (denoted as Pt/Nb$_2$CT$_x$ reduced) in 25% H$_2$/Ar at 350° C. for 2 hours (total flow rate was 50 mL min' and temperature ramping rate was 5° C. min$^{-1}$). After pretreatment, the temperature was decreased to 300° C. and the catalysts were exposed to the WGS mixture (standard conditions, 6.8% CO, 21.9% H$_2$O, 8.5% CO$_2$, 37.4% H$_2$, and balance Ar) with a flow rate of 75.4 mL min$^{-1}$. The catalyst was stabilized at 300° C. for a period of c.a. 20 hours for the initial stabilization to achieve. The apparent reaction orders were measured over the stabilized catalyst by varying the partial pressures of one component at a time over the range of 4-21% CO, 5-25% CO$_2$, 11-34% H$_2$O, and 14-55% H$_2$. WGS reaction rate under standard condition was checked after measurement of each apparent reaction order to measure the deactivation if there was any. For this catalyst, after the initial stabilization, no significant deactivation was observed during the full test (c.a. 50 hours). The apparent activation energy was measured under standard condition by varying the temperature over a range of 290° C. to 320° C. The WGS rate was normalized by the total Pt loading or by the number of surface Pt atoms determined by CO chemisorption. After the measurements were completed, the catalysts were passivated at room temperature in 30 mL min$^{-1}$ 2% O$_2$/Ar gas flow for 4 hours before they were taken out of the reactors.

Example 3. Characterizations

Powder X-ray diffraction (XRD) was carried out on a Rigaku Ultima U4 diffractometer, with Cu Kα radiation (λ=1.5418 Å), at 40 kV and 44 mA. Scanning Microscopy (SEM) was acquired on a FEI Quanta 250. HAADF-STEM imaging was conducted on a Titan Themis 300 probe corrected TEM equipped with a Super-X EDX detector from Sensitive Instrument Facility (SIF) of Ames Lab.

Pt loading of the Pt/Nb$_2$CT$_x$ catalyst was determined by atomic absorption spectroscopy (AAS). Specifically, the catalyst was digested (2 mL/1 mL/100 mg=aqua regia/HF/catalyst) in a Nalgene® amber polyethylene bottle for 3 days and the solution was then diluted to desired concentration for the AAS measurement.

H$_2$ temperature programmed reduction (TPR) experiment was performed with an Autochem 2000 unit. About 70 mg catalyst was loaded in the unit and dried in 50 sccm He at 200° C. overnight. Then the catalyst was cooled to room temperature and purged with pure H$_2$. The temperature was ramped from room temperature to 900° C. under 50 sccm pure H$_2$. The products were analyzed by a mass spectroscopy.

CO chemisorption was measured with an ASAP 2020 unit. About 100 mg catalyst was loaded and reduced at 350°

C. in pure $H_2$ before measuring for CO chemisorption. CO/Pt stoichiometry factor of 1 was used to calculate the Pt dispersion.

XPS data were obtained using a Kratos Axis Ultra DLD spectrometer with monochromic Al Kα radiation (1486.6 eV) at pass energy of 20 and 160 eV for high-resolution and survey spectra, respectively. A commercial Kratos charge neutralizer was used to avoid non-homogeneous electric charge of non-conducting powder and to achieve better resolution. The resolution measured as full width at half maximum of the curve fitted C 1s peak was approximately 1 eV. Binding energy (BE) values refer to the Fermi edge and the energy scale was calibrated using Au $4f_{7/2}$ at 84.0 eV and Cu $2p_{3/2}$ at 932.67 eV. XPS data were analyzed with CasaXPS software version 2313 Dev64. Curve-fitting was performed following a linear or Shirley background subtraction using Gaussian/Lorentzian peak shapes (GL and LF). The atomic concentrations of the elements in the near-surface region were estimated considering the corresponding Scofield atomic sensitivity factors and inelastic mean free path (IMFP) of photoelectrons using standard procedures in the CasaXPS software. For the quasi in situ XPS measurements, sample treatments were performed in a reaction cell ($\approx$30 cm$^3$) connected to the XPS spectrometer and all samples were reduced in 5% $H_2$ for 30 minutes. Then the samples were moved between the reaction cell and the analysis chamber under ultrahigh vacuum (UHV) conditions without contact to air.

X-ray absorption measurements were acquired at the Nb K edge (18.9856 keV) and Pt $L_{III}$ edge (11.5640 keV) on the bending magnet beam line of the Materials Research Collaborative Access Team (MRCAT) at the Sector 10 in the Advanced Photon Source, Argonne National Laboratory. Measurements were made in transmission step-scan mode. The ionization chambers were optimized for the maximum current with linear response with 10% absorption in the incident ion chamber and 70% absorption in the transmission detector. A third detector in series simultaneously collected a Nb or Pt metal foil reference spectrum with each measurement for energy calibration. Solid samples were pressed into a cylindrical sample holder consisting of six wells, forming a self-supporting wafer. The sample holder was placed in a quartz reactor tube sealed with Kapton windows by two ultra-torr fittings through which gas could be flowed. $Nb_2CT_x$ materials, parent $Nb_2AlC$ and reference compounds $Nb_2O_5$, $NbO_2$, NbC (Sigma-Aldrich) were scanned in air. Fresh Pt on $Nb_2CT_x$ catalyst were reduced in 3% $H_2$/He with a flow rate of 50 cm$^3$/min at 350 or 550° C. for 30 min, then cooled to room temperature and flushed with He before they were scanned. The 1% $Pt/Nb_2CT_x$ catalysts after water-gas-shift reaction were scanned in air.

Figure 14:
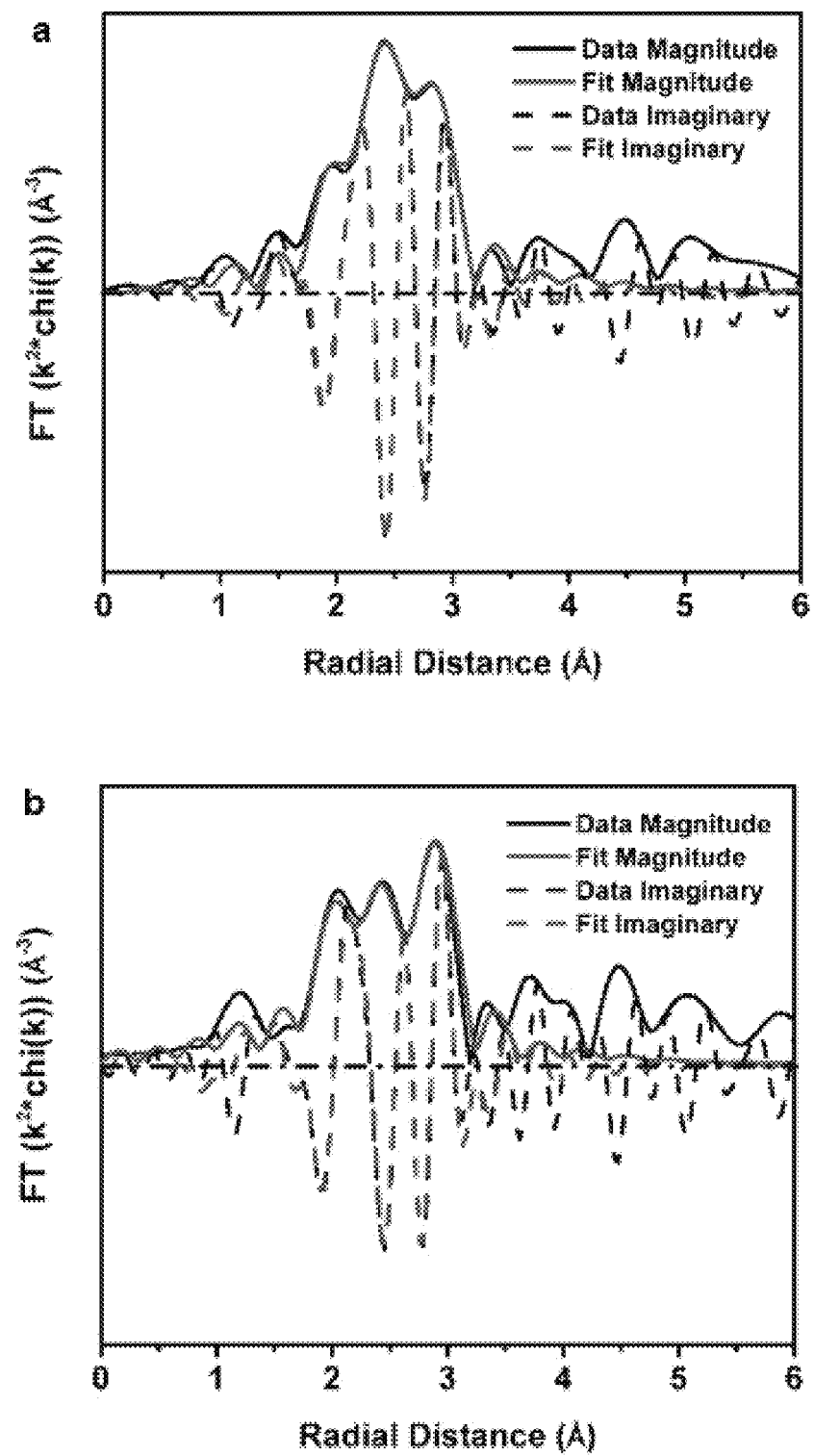
FIG. 14. The magnitude and imaginary part of the Fourier Transform of the $k^2$ weighted EXAFS plot and corresponding first shell fit for Pt/$Nb_2CT_x$ catalyst reduced at a) 350° C. and b) 550° C. The fitting ranges are $\Delta k$=2.7-11.7 Å$^{-1}$ and $\Delta R$=1.6-3.2 Å. Corresponding fitting results are as shown in Table 2.

The fits of the Extended X-ray Absorption Fine Structure (EXAFS) were evaluated using Artemis software (Demeter 0.9.26) (Ravel & Newville, ATHENA, ARTEMIS, HEPHAESTUS: data analysis for X-ray absorption spectroscopy using IFEFFIT. *J. Synchrotron Radiat.* 12, 537-541 (2005)). The EXAFS coordination parameters were obtained by a least-squares fit in R-space of k$^2$-weighted Fourier transform data together (FIG. 14 and Table 2). The data range is from 3.0 to 12.0 Å$^{-1}$ in k space. For R space, the data was fitted from 1.0 to 3.0 Å in R space at the Nb edge and 1.6 to 3.2 Å at the Pt edge. The $S_0^2$ value was obtained at Nb edge by fitting the NbC standard and at Pt edge by fitting Pt foil. The bond distances were adjusted based on initial inputs from standard crystal structure information files of $Nb_2AlC$ and $Pt_3Nb$ for the fits of Nb edge and Pt edge, respectively (Jeitschko et al., *Monatsh. Chem.* 94, 672-676 (1963); Zhao et al., *Acta Crystallogr., Sect. C: Cryst. Struct. Commun.* 47, 479-483 (1991)).

TABLE 2

Quantitative evaluation of the EXAFS fit (Artemis Software).

| Sample | Scattering Pair | $S_0^2$ * | CN * | Bond Length (Å) * | $\Delta E_0$ (eV) * | $\sigma^2$ (Å$^2$) * |
|---|---|---|---|---|---|---|
| $Pt/Nb_2CT_x$ Reduced at 350° C. | Pt-Pt | 0.8 | 7.4 | 2.75 | 4.7 | 0.005 |
| | Pt-Nb | | 0.9 | 2.77 | | 0.012 |
| $Pt/Nb_2CT_x$ Reduced at 550° C. | Pt-Pt | 0.8 | 6.0 | 2.77 | 6.6 | 0.005 |
| | Pt-Nb | | 2.9 | 2.77 | | 0.008 |

* The $S_0^2$ is fixed at the value obtained by fitting a Pt foil reference. The error of all the fitted parameters are very close. The average error in CN (coordination number) is 0.5, in bond length is 0.02 Å, in $\Delta E_0$ is 0.8 eV and in $\sigma^2$ is 0.002 Å$^2$.

Example 4. Pt/TiC-MXene as a 2-D Structure Catalyst for the Water-Gas Shift Reaction A novel 2-D TiC-MXene nanomaterial with layered structure was prepared by the methods described herein. Platinum was loaded by the incipient-wetness impregnation method. The catalyst was tested for the water-gas shift (WGS) reaction. Temperature programmed reduction (TPR) was performed to determine the reduction temperature range of the TiC-MXene. The 2-D carbide MXene catalyst was successfully applied to the WGS reaction and the results are provided herein below.

Experimental.

$Ti_3C_2T_x$ MXene was prepared by etching $Ti_3AlC_2$ powder with HF (50%) at 35° C. for 24 hours. The $Ti_3AlC_2$ powder was synthesized by spark plasma sintering (SPS) of $TiH_2$/Al/TiC. In detail, commercial powders of $TiH_2$, Al and TiC were mixed with a molar ratio of $TiH_2$:Al:TiC=1:1.2:2 in a graphite die coated with boron nitride (BN). Excess Al and less graphite were added because Al will be lost during high-temperature processing and carbon deficiencies exists in most Al-containing MAX phases. Then the tooling was loaded in a Fuji-211lx SPS system and sintered at 1350° C. under 30 MPa for one hour. The resulting $Ti_3AlC_2$ was then pulverized and sieved through a 325-mesh screen.

Pt/TiC-MXene was prepared by the incipient wetness impregnation method. Typically, certain amount of tetraamine platinum nitrate was dissolved in deionized water to make a solution with a concentration of 0.02 g Pt/mL. Then the solution was added dropwise to the support until incipient-wetness (about 0.5 mL per gram of support). The mixture was then dried under vacuum at ambient temperature. The final Pt loading was about 1% determined by atomic absorption spectroscopy.

WGS kinetics were measured with a plug flow reactor. About 200 mg catalyst was loaded in the reactor and pretreated in 25% $H_2$/Ar at 350° C. for 2 hours (total flow rate 50 sccm). Then the catalyst was exposed to standard WGS gas mixture at 330° C. (8.5% $CO_2$, 21.9% $H_2O$, 6.8% CO, 37.4% $H_2$, and balanced Ar) with a total flow rate of 75.4 sccm until a stable conversion was achieved. The apparent reaction orders were measured at 330° C. by varying the partial pressures of one component at a time over the range of 4-21% CO, 5-25% $CO_2$, 11-34% $H_2O$, and 14-55% $H_2$. WGS reaction rates were measured under standard condition after each apparent reaction order measurement to check for any deactivation of the catalyst. The apparent activation energy was measured within the temperature range 320-350° C. under the standard WGS condition. After the measurements were complete, the catalysts were passivated at room temperature by 2% $O_2$ in inert gas flow before they were removed from the reactors.

$H_2$ temperature-programmed reduction (TPR) was performed on a micromeritics Autochem 2000 unit. About 70 mg $Ti_3C_2T_x$ was loaded in the unit and 50 sccm $H_2$ was flowed through the sample. The temperature was ramped to 900° C. by 10° C./min and kept at 900° C. for 10 min. The outlet gas was detected by a mass spectrometer. Pt dispersion was determined by a micromeritics ASAP 2020 unit.

Results.

Figure 15:
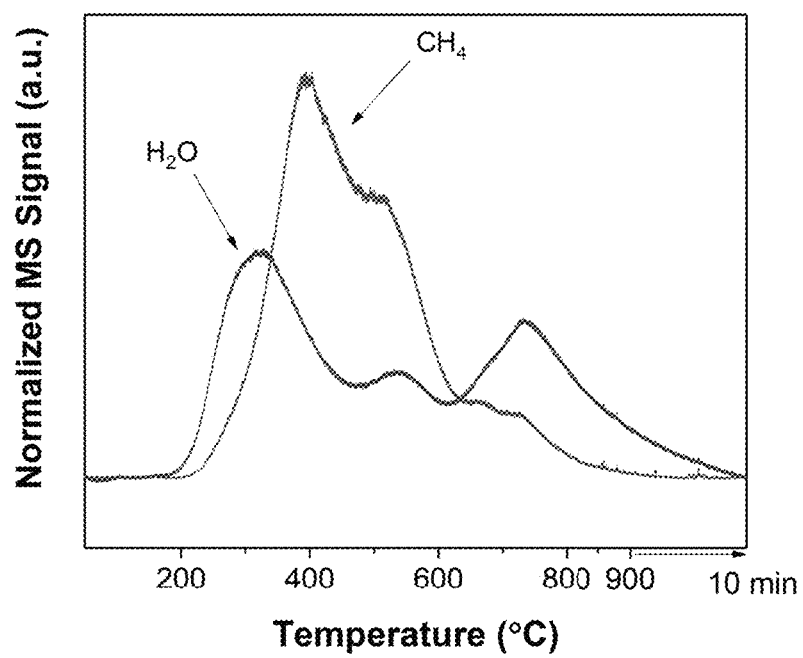
FIG. 15. $H_2$-TPR of the $Ti_3C_2T_x$ support.

The reducibility of the $Ti_3C_2T_x$ was determined by $H_2$-TPR. The results are shown in FIG. 15. The signal was normalized by the total weight of the sample loaded and the MS sensitivity of different molecules. The $H_2O$ peak at around 300° C. was considered to be the reduction of the surface oxygen. The major $CH_4$ peaks between 380° C. and 400° C. were assigned to the reduction of the carbide support. Accordingly, 350° C. was chosen as the reduction temperature to remove the surface oxygen while maintain the bulk structure unchanged.

Figure 16:
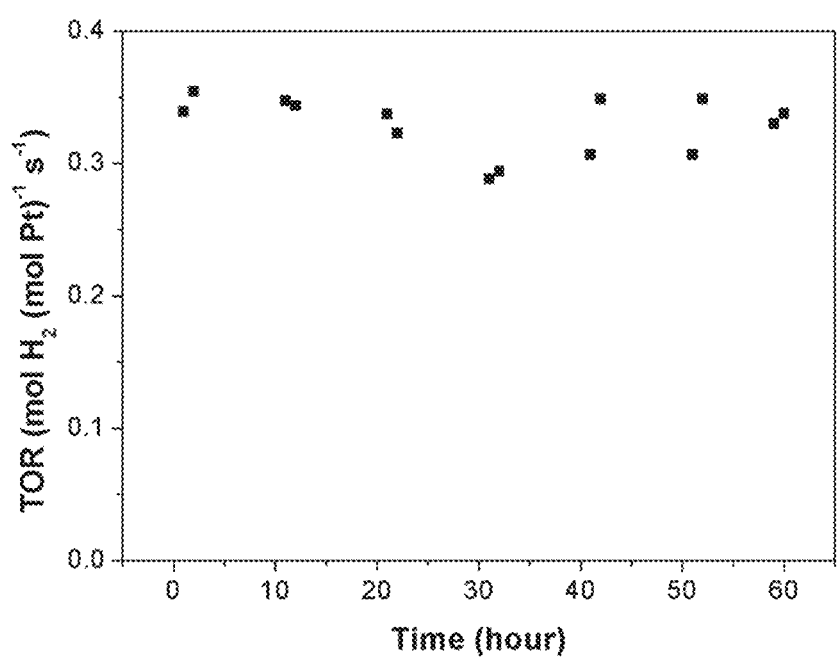
FIG. 16. Time on stream plot of the $Ti_3C_2T_x$ MXene under standard WGS condition.
Figure 17:
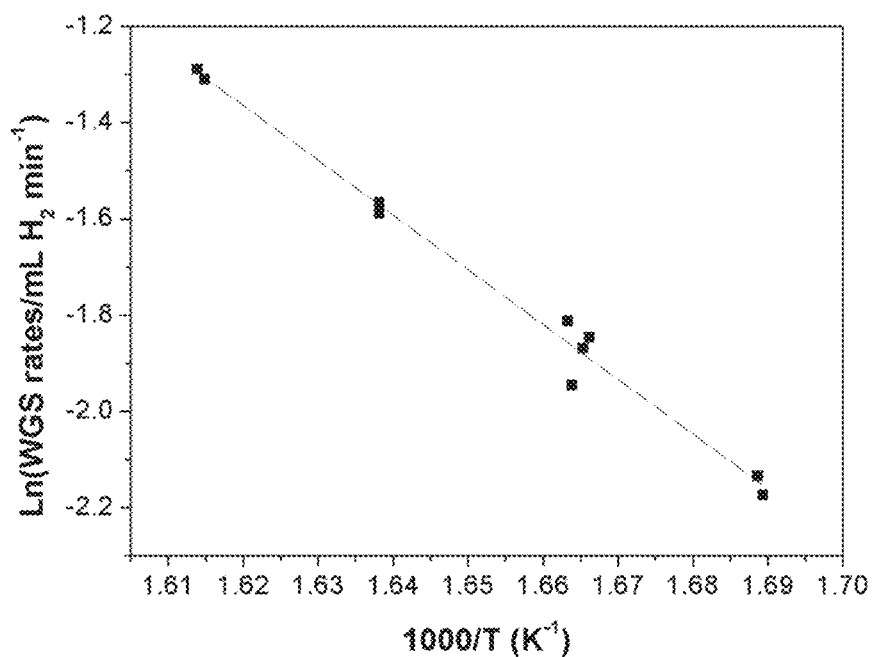
FIG. 17. Arrhenius plot of $Ti_3C_2T_x$ MXene for apparent activation energy calculation.
Figure 18:
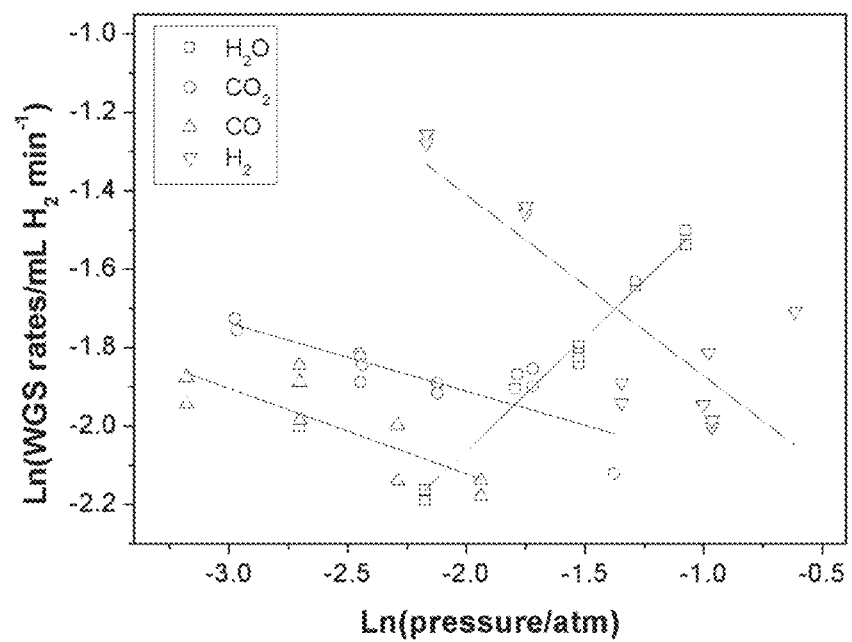
FIG. 18. $Ti_3C_2T_x$ MXene plots for apparent reaction order calculation.

The stability of the catalyst during the WGS reaction is shown in FIG. 16. The catalyst showed little deactivation over the test time range (~60 hours). Due to the reversibility of the WGS reaction, the apparent activation energy and the reaction orders with respect to CO, $H_2O$, $H_2$ and $CO_2$ were fitted to a power rate law expression of the form:

$$r = A\exp\left(-\frac{E_{app}}{RT}\right)[CO]^a[CO_2]^b[H_2]^c[H_2O]^d(1-\beta)$$

where r is the overall rate, $\beta=([CO_2][H_2])/(K_{eq}[CO][H_2O])$ is the approach to equilibrium, A and $E_{app}$ are the apparent pre-exponential factor and apparent activation energy for the forward rate. The numbers a, b, c and d are apparent reaction orders. $K_{eq}$ is the equilibrium constant for the WGS reaction. The apparent activation energy was calculated by the Arrhenius plot. The apparent reaction orders were calculated from the slope of the log plot of the rate vs. the partial pressure of certain gas. FIG. 17 and FIG. 18 show typical plots used for measuring the WGS kinetics parameters. Table 3 shows the detailed WGS kinetic data. WGS kinetics of $Pt/Al_2O_3$ was adopted as a comparison which was tested under the same condition and the same procedure.

TABLE 3

WGS kinetics summary

| Catalysts | WGS Rates per mole of Pt at 300° C./ $10^{-2}$ mol $H_2$ (mol metal)$^{-1}$ s$^{-1}$ | TOR at 300° C./ $10^{-2}$ mol $H_2$ (mol surface metal)$^{-1}$s$^{-1}$ | Ea/ kJ(mol)$^{-1}$ | $H_2O$ | $CO_2$ | CO | $H_2$ | Percentage of exposed Pt (%) |
|---|---|---|---|---|---|---|---|---|
| 1% Pt/$Ti_3C_2$-MXene | 0.4 | 14.3 | 95 | 0.6 | −0.2 | −0.2 | −0.5 | 3 |
| 1.5% Pt/$Al_2O_3$ | 1.4 | 4 | 96 | 0.9 | −0.1 | 0.1 | −0.5 | 35 |

The $Ti_3C_2T_x$ MXene catalyst showed about one third WGS rate per mole of Pt compared with Pt/$Al_2O_3$. However, due to the low Pt dispersion determined, the turn-over rate (TOR) was more than 3 times higher than that of Pt/$Al_2O_3$ catalyst. $Ti_3C_2T_x$ MXene showed similar apparent activation energy compared with Pt/$Al_2O_3$ but quite different apparent reaction orders. The $Ti_3C_2T_x$ MXene showed a much lower CO order and lower $H_2O$ order compared with Pt/$Al_2O_3$. The apparent reaction orders are usually negatively correlated with the relative surface coverage of the corresponding component. The lower CO and $H_2O$ order here implies a higher relative surface coverage on $Ti_3C_2T_x$ MXene than Pt/$Al_2O_3$. This implies that the $Ti_3C_2T_x$ MXene has better ability for CO adsorption and $H_2O$ dissociation, which are key factors influencing the overall WGS rate. Thus, $Ti_3C_2T_x$ showed great potential as a new type of WGS catalyst support.

$Ti_3C_2T_x$ was therefore adopted as a new type of 2-D nanomaterial support for the WGS reaction. It showed good stability towards the reaction together with better ability for CO adsorption and $H_2O$ dissociation. It opens new possibilities for WGS catalyst and reaction design.

Example 5. $Ti_3C_2T_x$ and $Nb_2CT_x$ MXene and Catalyst Structural Analysis

Figure 19:
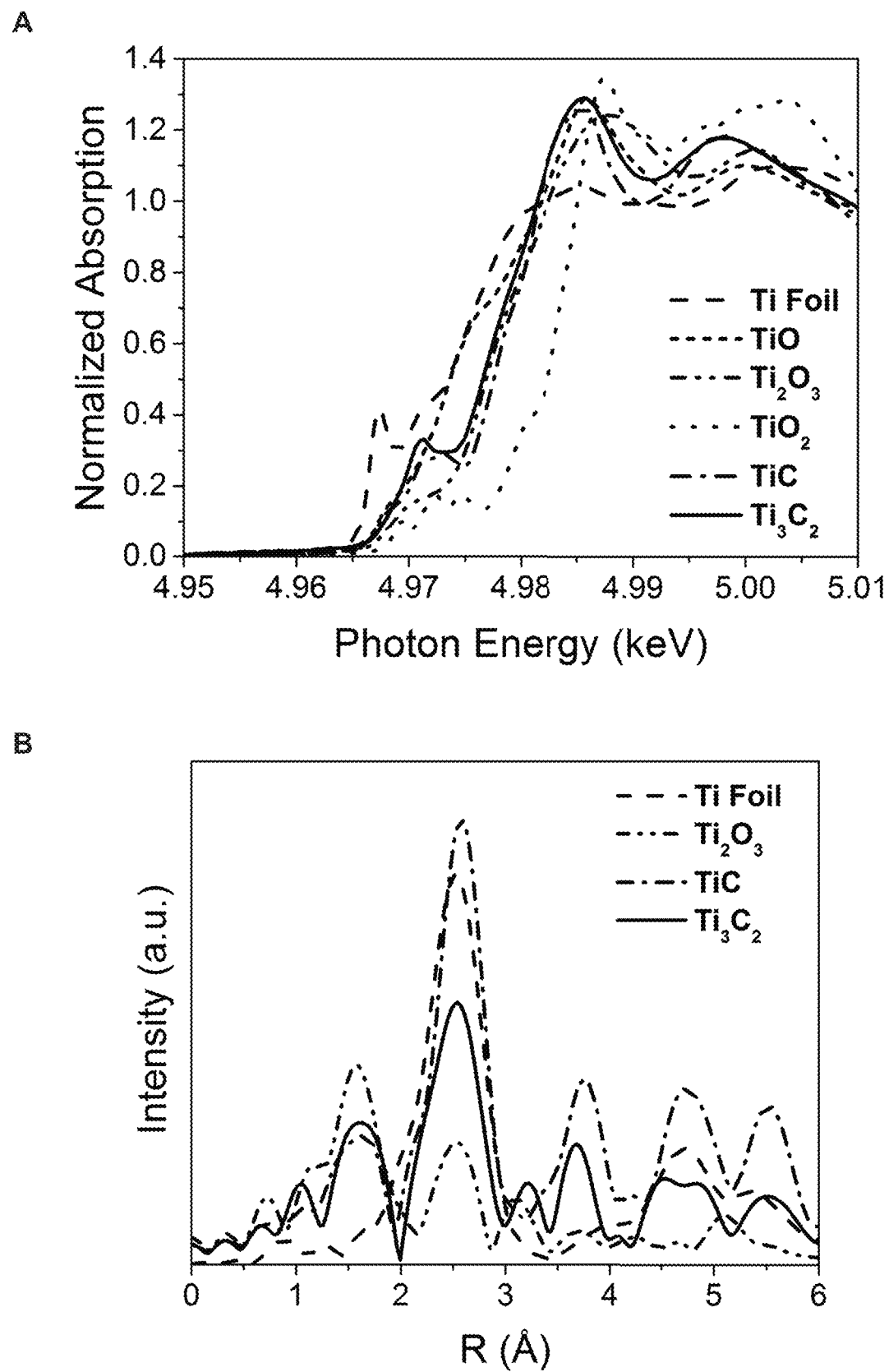
FIG. 19. Ti K edge A) XANES spectra and B) magnitude of the Fourier Transform of the $k^2$ EXAFS of $Ti_3C_2$ compared to references (Ti foil, $TiO_2$, $Ti_2O_3$, $TiO_2$, and TiC); Nb K edge C) XANES spectra and D) magnitude of the Fourier Transform of the $k^2$ EXAFS of $Nb_2C$ compared to references (Nb Foil, $Nb_2O_5$, $NbO_2$, and NbC).
Figure 19:
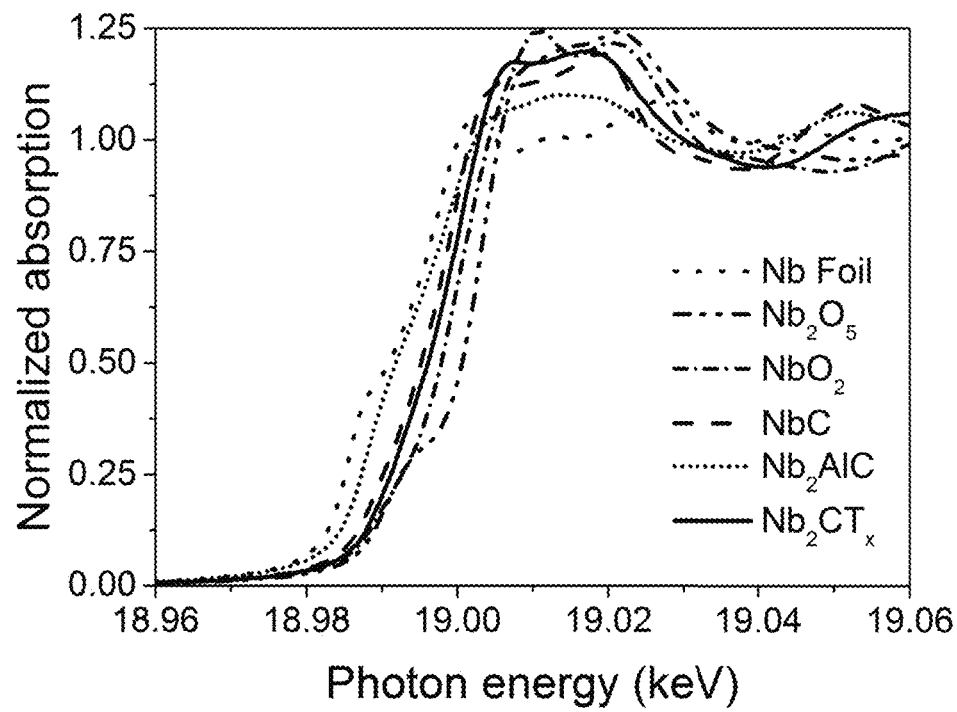
Figure 19:
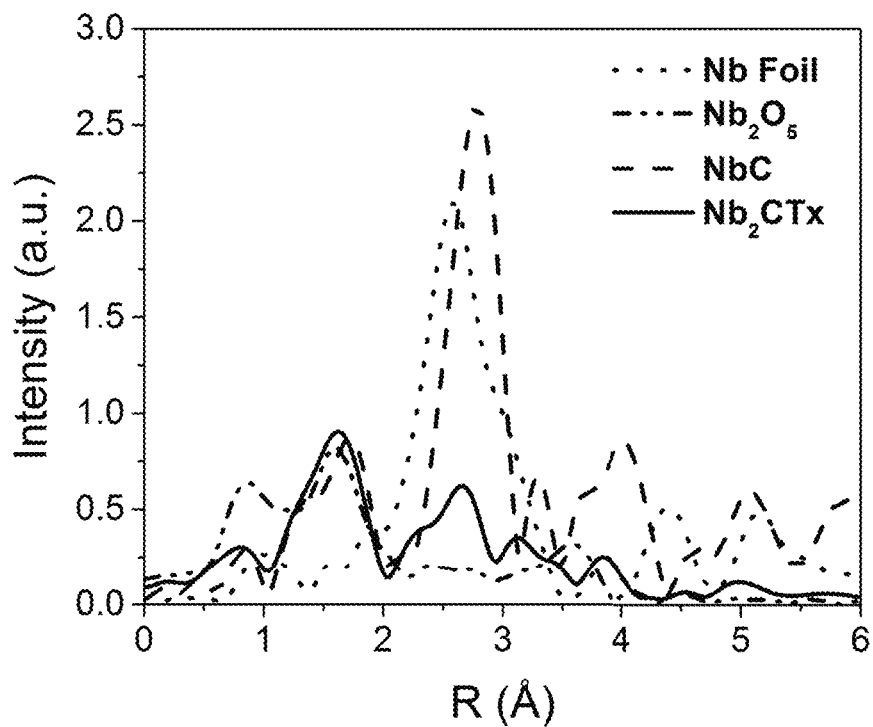

The XAS of $Ti_3C_2T_x$ material shows features evident of carbide. The shape and edge energy (Table 4) of the XANES spectra are very similar to that of the bulk TiC standard as opposed to Ti foil or any of the Ti oxides (see FIG. 19A).

TABLE 4

XANES edge energy for Ti K edge.

| Sample Name | Pre-Edge Peak (eV) | Main Edge Peak (eV) |
|---|---|---|
| Ti Foil | 4966.4 | 4966.4 |
| $TiO_2$ | 4968.6 | 4979.2 |
| $Ti_2O_3$ | 4968.2 | 4976.5 |
| TiO | 4967.2 | 4673.1 |
| TiC | 4967.1 | 4977.7 |
| $Ti_3C_2$ | 4967.3 | 4976.7 |

The pre-edge of $Ti_3C_2T_x$ also shows up at energy close to TiC. The intensity is slightly higher than TiC, consistent with a less symmetrical octahedral coordination environment around Ti in $Ti_3C_2T_x$ due to binding with both carbon and terminal groups (T=O, OH, and/or F) on the MXene surface. The EXAFS spectrum of $Ti_3C_2T_x$ is in contrast to Ti foil or Ti oxide that has either only Ti—Ti or only Ti—O scattering. The EXAFS spectrum shows first shell Ti—C scattering similar to TiC but lower second shell Ti—C—Ti, corresponding to the 2-dimensionality of the materials.

Figure 20:
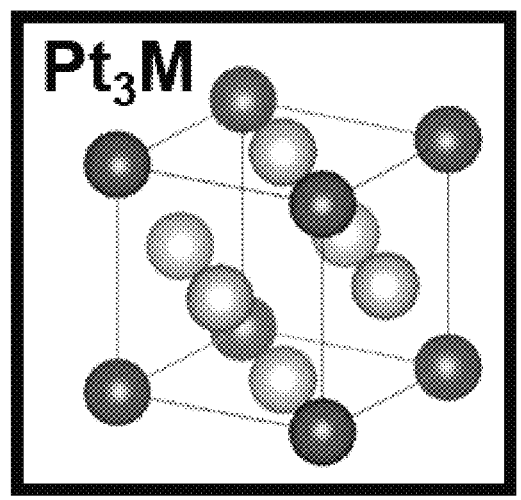
FIG. 20. $Cu_3Au$ type $L1_2$ intermetallic alloy structure for $Pt_3Ti$ and $Pt_3Nb$.

Similar results are obtained for $Nb_2CT_x$ compared to the references, which shows XANES spectra similar to NbC but not Nb foil or oxides. The 2-D structure of $Nb_2CT_x$ leads to reduced second shell EXAFS scattering. After reduction at 5% $H_2/N_2$ at 550° C. for 30 min, the XAS feature of both the $Ti_3C_2T_x$ and $Nb_2CT_x$ in the Pt-loaded catalysts stay mostly unchanged (FIG. 20 and Table 5), indicating the carbide nanosheets structure is preserved in the catalysts.

TABLE 5

XANES edge energy for Nb K edge.

| Sample Name | Main Edge Peak (eV) |
|---|---|
| Nb Foil 2 | 18997.6 |
| $Nb_2O_5$ | 19003.3 |
| $NbO_2$ | 19000.5 |
| NbC | 18999.2 |
| $Nb_2AlC$ | 18998.7 |
| $Nb_2C$ | 19000.7 |

Figure 21:
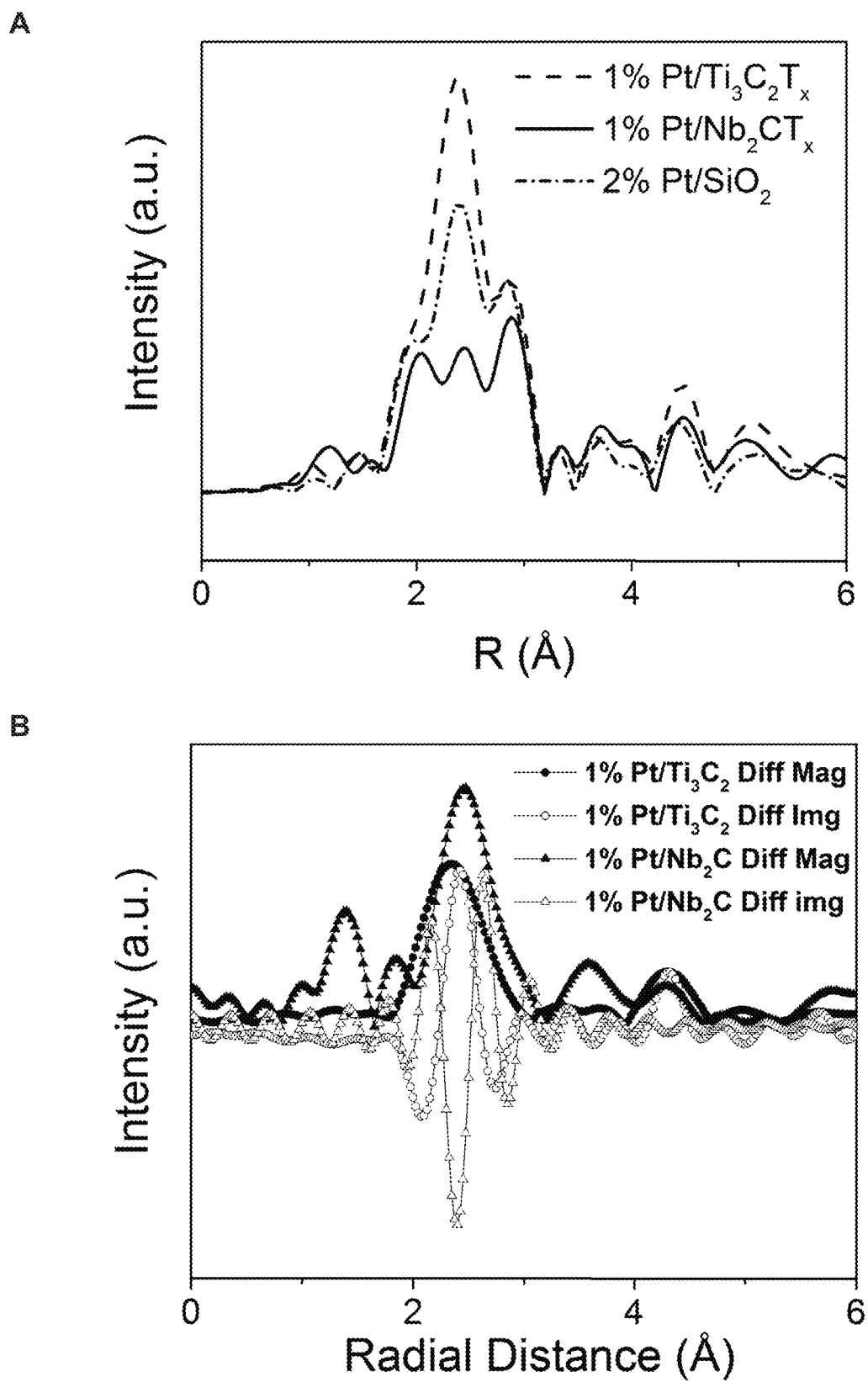
FIG. 21. Pt $L_{III}$ edge A) Magnitude of the Fourier Transform of the $k^2$ weighted EXAFS of the $Pt/Ti_3C_2T_x$ and $Pt/Nb_2CT_x$ catalyst after reduction at 550° C. in $H_2$ and B) the extracted Pt—Ti and Pt—Nb scattering showing antiphase in the most intensive region; C) the XANES spectra of the $Pt/Ti_3C_2T_x$ and $Pt/Nb_2CT_x$ catalyst after reduction at 550° C. in $H_2$.
Figure 21:
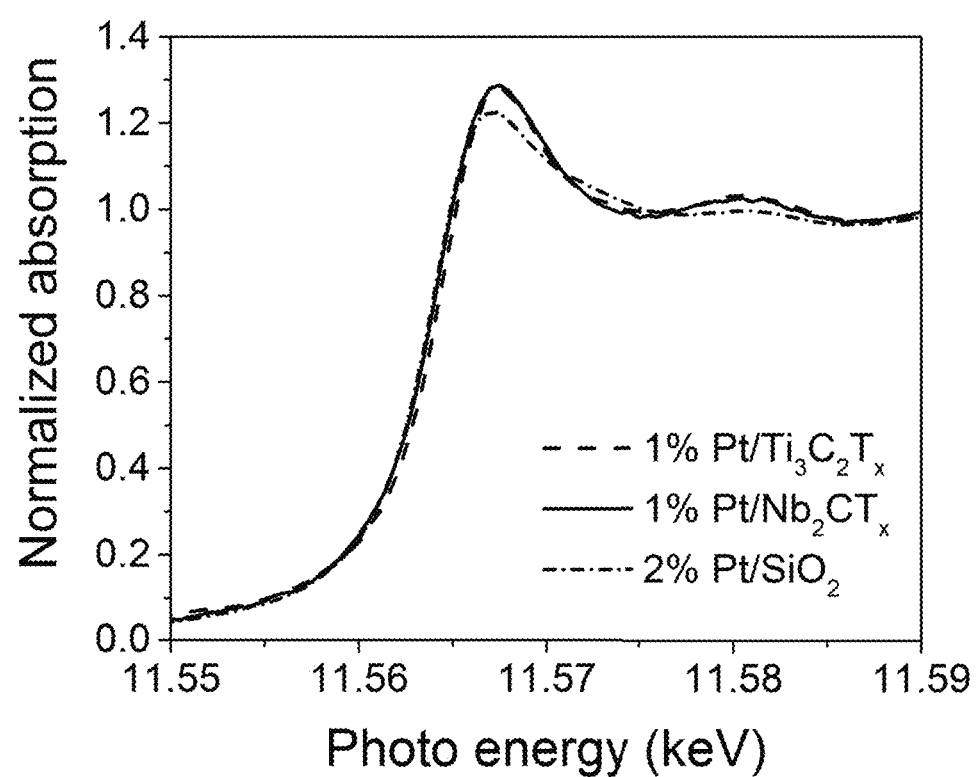

$Pt_3Ti$ and $Pt_3Nb$ intermetallic nanoparticles formed through RMSI. $Pt_3Ti$ and $Pt_3Nb$ intermetallic catalysts were prepared by interaction between Pt NPs and $Ti_3C_2T_x$ and $Nb_2CT_x$ supports. Reactive metal-support interactions (RMSIs) were induced when pretreating the catalyst with 5% $H_2/N_2$ at 550° C. before catalytic reaction. The changes in the nanoparticle structure afterwards were followed by in situ XAS (FIG. 21). The EXAFS spectra of both samples show scattering in the metal-metal bonding region significantly different compared to Pt on $SiO_2$ with the same size. For Pt on $Ti_3C_2T_x$, the middle peak in the 3-peak pattern shows much higher intensity than Pt on $SiO_2$ due to in-phase constructive interference between Pt—Ti scattering and Pt—Pt, whereas the opposite (out-of-phase destructive interference between Pt—Nb and Pt—Pt) is observed for Pt on $Nb_2CT_x$. Such difference in the phase shift between Pt—Ti and Pt—Nb at similar bond distances is better demonstrated comparing the imaginary part of their EXAFS extracted from the total scattering by subtracting Pt—Pt (FIG. 21B). Fitting the curve gives 5.8 Pt—Pt bond and 3.0 Pt—Ti bond both at 2.75 Å for Pt on $Ti_3C_2T_x$ and 6.1 Pt—Pt bond and 2.8 Nb bond at 2.76 Å for Pt on $Nb_2CT_x$. The bond distances and ratio of the Pt—Pt/Pt-TM coordination numbers are consistent with formation of $Cu_3Au$ type $L1_2$ intermetallic alloy structure, which is further confirmed by ARSTEM.

Alloy formation leads to altered band structure for Pt on $Ti_3C_2T_x$ and $Nb_2CT_x$ catalysts. From XANES spectra, their edge energies are shifted higher from 11564.0 eV for pure Pt, to 11564.3 eV and 11564.6 eV, respectively, indicating modification of the Pt 5d bands. The whitelines are slightly higher and narrower compared to $Pt/SiO_2$, showing the opposite trend compared to intermetallics formed between Pt and late transition metals (TMs) or main group metals (such as Zn, In, Sn), indicating a different electronic effect when early TMs such as Ti and Nb are used as promoters for Pt. The shift in band energy level was also detected by XPS.

To visualize the formation of the alloy, high angle annular dark field scanning transmission electron microscopy (HAADF-STEM) and X-ray energy-dispersive spectroscopy (XEDS) were performed. In the STEM images (FIG. 22a) the ordered intermetallic structure at the center of the NP is showed by alternating bright (Pt column) and darker (Ti column) contrast due to greater electron scattering to large detector collection angles by heavier atoms. In the EDS spectrum (FIG. 22b-d), the overlay of signals of Pt and Ti confirm the presence of an alloy. Therefore, XAS and STEM both confirm the formation of the alloy that accounts for the higher propylene selectivity compared to pure Pt catalysts.

Figure 10:
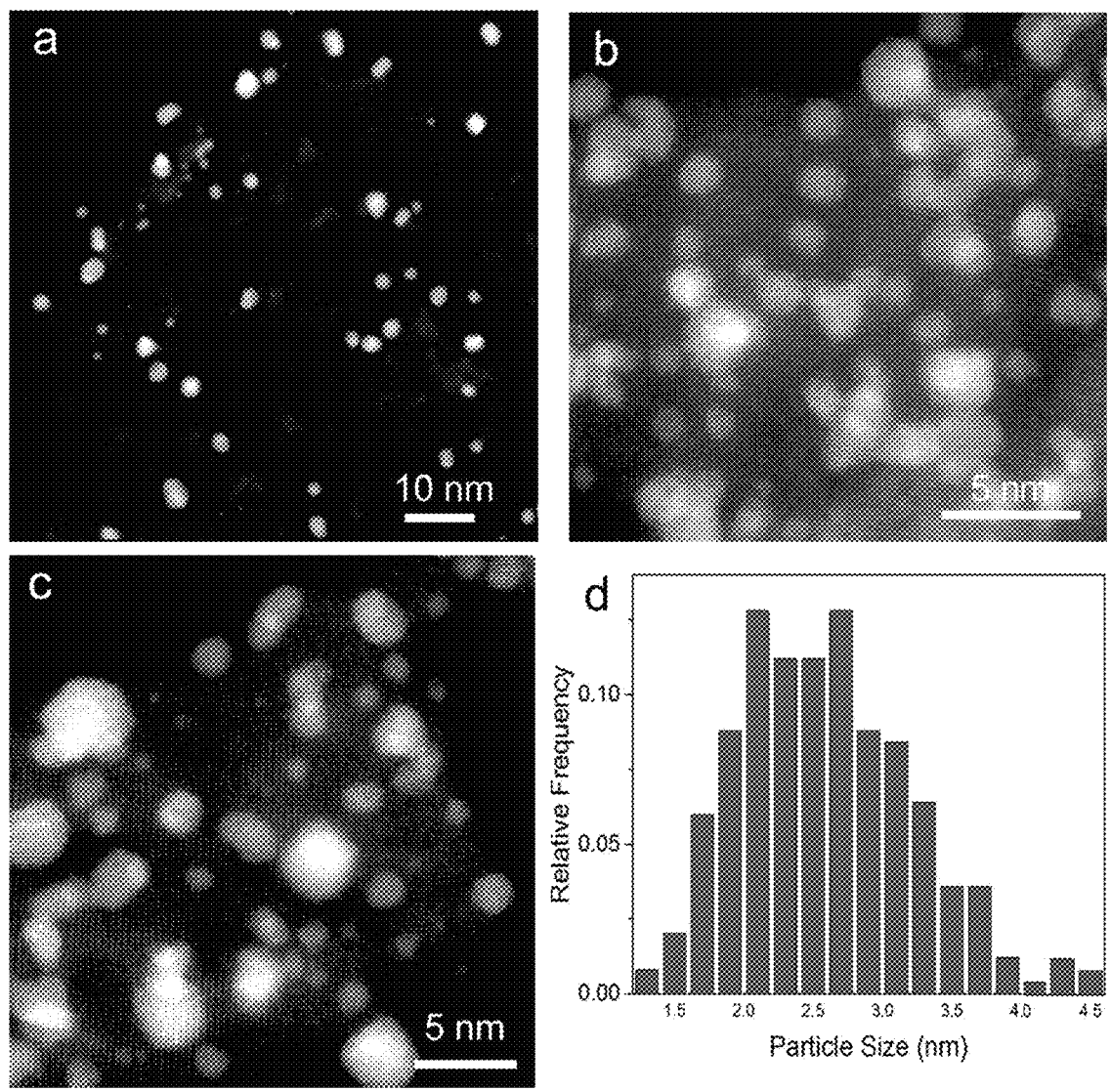
FIG. 10. (a-c) HRTEM image of 1% Pt/$Nb_2CT_x$ after WGS reaction. (d) Particle size distribution statistics of used 1% Pt/$Nb_2CT_x$ catalyst; the average particle size was determined to be 2.6 nm.
Figure 22:
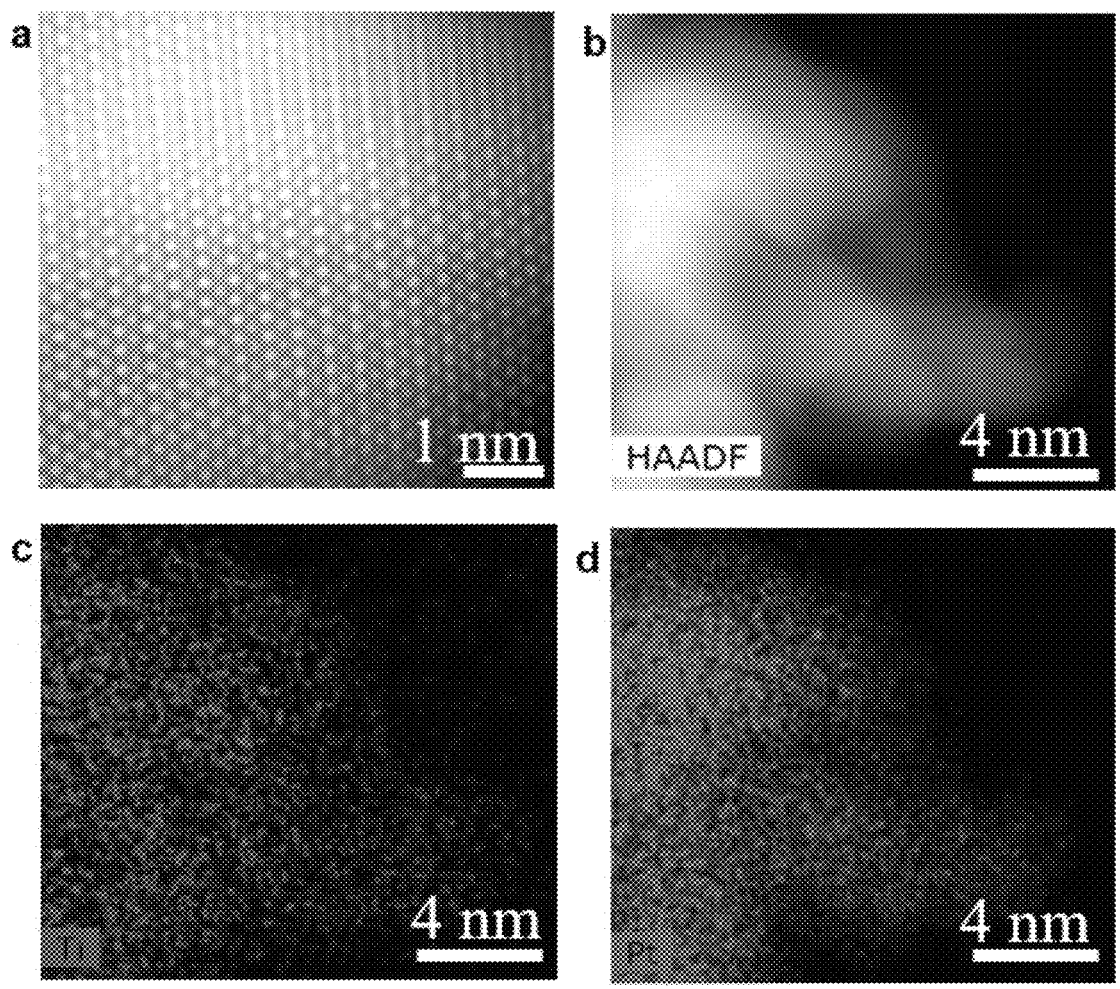
FIG. 22. High-resolution HAADF-STEM images of $Pt_3Ti$ nanoparticle, (a) size bar=1 nm; (b) size bar=4 nm. Elemental mappings of Ti (c) versus Pt (d). (e) HAADF-STEM images of 1% $Pt/Ti_3C_2T_x$ catalyst showing an average particle size approximately 2 nm.
Figure 22:
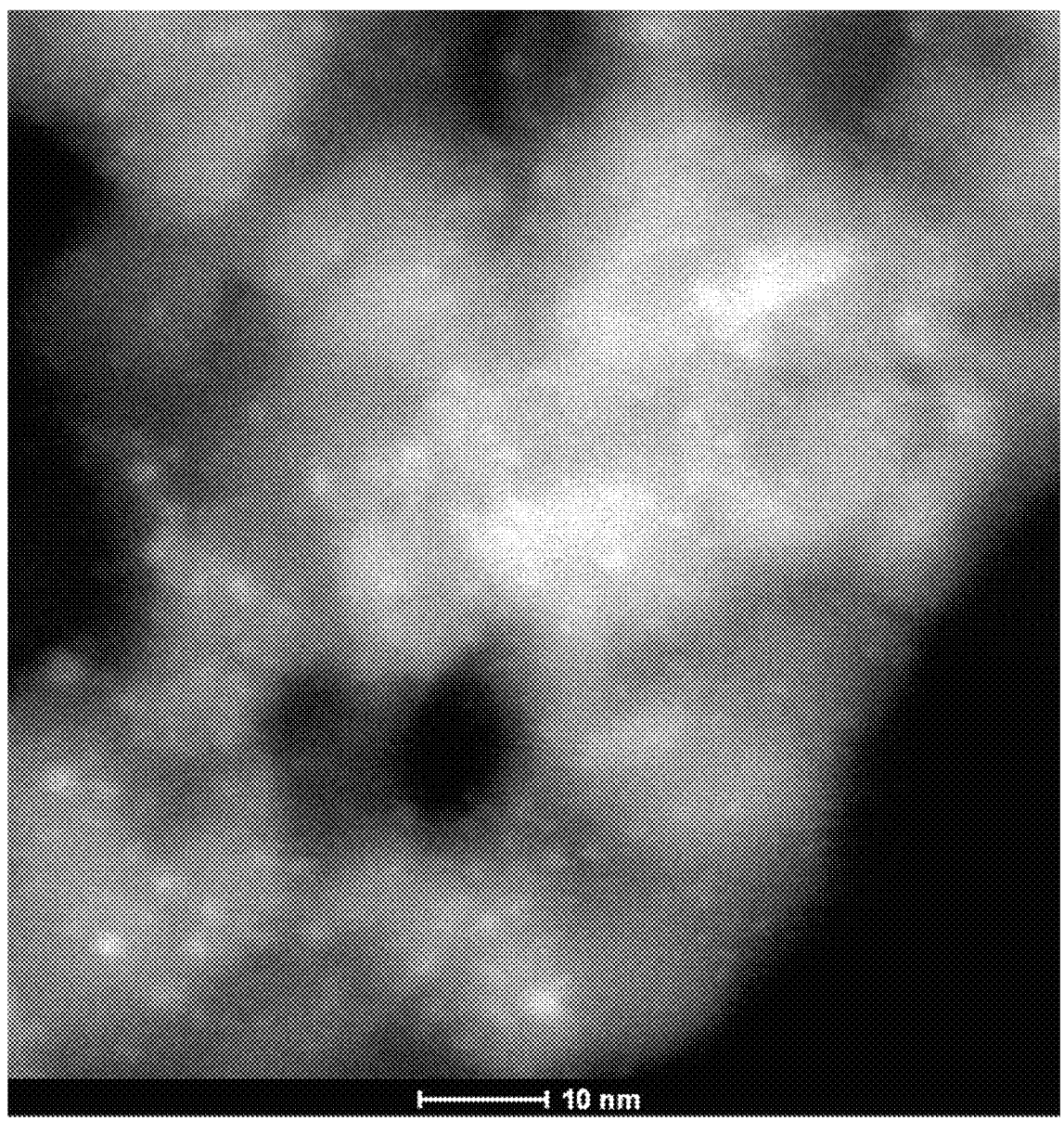

Particle Size Distribution. STEM images were taken at Birck Nanotechnology Center at Purdue University using the FEI Titan Scanning Transmission Electron Microscope (80-300 kV, 1 nm spatial resolution in STEM). Samples were ground to fine powders and dispersed in isopropyl alcohol. Three drops of the solution were added onto an ultrathin Carbon film-Au TEM ready grid (TedPella) and dried on a hot plate at 70° C. STEM images were taken using the high angle annular dark field (HAADF) detector at 300 kV and particle size was counted using the ImageJ program. A minimum of 200 particles were counted to obtain the size distribution for each catalyst (FIG. 22e). Analysis of data indicated that the average particle size of $Pt/Nb_2CT_x$ particles by HRTEM imaging was about 2.6 nm (FIG. 10d). Analysis of annular dark-field STEM overview images of $Pt/Ti_3C_2T_x$ reduced by 5% $H_2/N_2$ at 550° C. showed an average particle size of about 6 nm (>100 particle count).

Example 6. Light Alkane Dehydrogenation Kinetics

Light alkane dehydrogenation kinetics measurements were carried out in a quartz fixed-bed reactor with ⅜-inch ID. A mass of 0.02-0.15 g of catalysts were diluted with pure $SiO_2$ to 1.00 g total weight and loaded. A thermocouple within a stainless-steel thermocouple well was placed at the bottom center of the catalyst bed to measure the reaction temperature inside the bed. The products were analyzed with an Agilent 7890A gas chromatograph system equipped with a Flame Ionization Detector (FID). Before each test, the catalyst was first reduced under 50 cm³/min 5% $H_2/N_2$ while the temperature was raised to 550° C. and held at 550° C. for 30 minutes.

For propane dehydrogenation, a reaction atmosphere of 2.5% $C_3H_8$, 2.5% $H_2$ balanced in $N_2$ with a total flow rate of 200 cm³/min was used. Catalyst selectivity was compared at 20% conversion at 550° C. and turnover rates (TORs, per surface Pt site) were measured under differential condition at conversion below 5%. See FIG. 23 for conversion and selectivity data.

For isobutane dehydrogenation, a reaction atmosphere of 2.5% $C_3H_8$, 2.5% $H_2$ balanced in $N_2$ with a total flow rate of 100 cm³/min was used. Catalyst performance was measured at 450° C. The selectivity to isobutene for Pt/MXene catalysts is significantly higher than that of the $Pt/SiO_2$ catalyst. See FIG. 24.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A catalyst comprising platinum and a MXene comprising Formula I:

$$M_{n+1}X_n \qquad (I)$$

wherein n is 1, 2, or 3;

M is an early transition metal; and

X is carbon, nitrogen or CN;

wherein the platinum is bonded to the early transition metal (M) via a metal-metal bond to form an intermetallic alloy; and wherein the intermetallic alloy has the formula $Pt_3M$ and an $L1_2$ type crystal structure.

2. The catalyst of claim 1 wherein n is 1 or 2.

3. The catalyst of claim 2 wherein the early transition metal is titanium, vanadium, zirconium, niobium, hafnium, tantalum, molybdenum, or tungsten.

4. The catalyst of claim 3 wherein the catalyst has an average particle size that is about 0.5 nm to about 20 nm.

5. The catalyst of claim 3 wherein X is carbon.

6. The catalyst of claim 5 wherein the MXene of Formula I comprises $Ti_3C_2$ or $Nb_2C$.

7. The catalyst of claim 1 consisting essentially of platinum and $Ti_3C_2$.

8. The catalyst of claim 1 wherein the catalyst has a metallic titanium content less than about 0.05 wt. %.

9. The catalyst of claim 1 consisting essentially of platinum and $Nb_2C$.

10. A method to provide hydrogen gas as a product of a water gas shift reaction comprising contacting water, carbon monoxide, and the catalyst according to claim 1;

at a temperature of at least about 200° C., thereby carrying out the water gas shift reaction to provide hydrogen gas.

11. The method of claim 10 wherein n is 1 or 2, and the early transition metal is titanium, vanadium, zirconium, niobium, hafnium, tantalum, molybdenum, or tungsten.

12. The method of claim 11 wherein the MXene of Formula I comprises $Ti_3C_2$ or $Nb_2C$.

13. The method of claim 10 wherein the platinum loading of the catalyst is about 0.5% to about 20% and the percentage of exposed platinum of the catalyst is about 3-5% of the platinum loading.

14. The method of claim 10 wherein the contacting is performed at a temperature of at least 250° C. for a period of time sufficient to carry out the water gas shift reaction to provide hydrogen gas.

15. The method of claim 14 wherein the early transition metal is titanium or niobium.

16. A method for dehydrogenating an alkane comprising contacting an alkane and the catalyst according to claim 1;

at a temperature of at least about 350° C., thereby dehydrogenating the alkane to provide an alkene.

17. The method of claim 16 wherein n is 1 or 2; and the early transition metal is titanium, vanadium, zirconium, niobium, hafnium, tantalum, molybdenum, or tungsten.

18. The method of claim 17 wherein the MXene of Formula I is $Ti_3C_2$ or $Nb_2C$.

19. The method of claim 18 wherein the MXene of Formula I is $Ti_3C_2$ and the catalyst has an average particle size of about 6 nm, or the MXene of Formula I is $Nb_2C$ and the catalyst has an average particle size of about 2.6 nm.

20. The method of claim 16 wherein the alkane is propane and the selectivity for producing propylene from propane is at least 85%, or wherein the alkane is isobutane and the selectivity for producing isobutylene from isobutane is at least 85%.

21. The method of claim 16 wherein the dehydrogenation is carried out in a fixed bed reactor or in a continuous flow reactor.

22. The method of claim 16 wherein the alkane is a linear, branched, or cyclic $(C_2-C_8)$alkane.

* * * * *